(12) United States Patent
Sakano et al.

(10) Patent No.: US 10,537,836 B2
(45) Date of Patent: Jan. 21, 2020

(54) FILTER MEDIUM FOR AIR FILTER, FILTER PACK, AIR FILTER UNIT AND METHOD FOR PRODUCING THE FILTER MEDIUM FOR AIR FILTER

(71) Applicant: DAIKIN INDUSTRIES, LTD., Osaka-shi, Osaka (JP)

(72) Inventors: Tatsumi Sakano, Osaka (JP); Kunihiko Inui, Osaka (JP); Yoshiyuki Shibuya, Osaka (JP); Hideyuki Kiyotani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/084,127

(22) PCT Filed: Mar. 8, 2017

(86) PCT No.: PCT/JP2017/009229
§ 371 (c)(1),
(2) Date: Sep. 11, 2018

(87) PCT Pub. No.: WO2017/154980
PCT Pub. Date: Sep. 14, 2017

(65) Prior Publication Data
US 2019/0344204 A1 Nov. 14, 2019

(30) Foreign Application Priority Data
Mar. 11, 2016 (JP) .................................. 2016-048804

(51) Int. Cl.
*B01D 53/22* (2006.01)
*B01D 39/16* (2006.01)
(Continued)

(52) U.S. Cl.
CPC ............. *B01D 39/16* (2013.01); *B01D 46/10* (2013.01); *B01D 39/20* (2013.01); *B01D 63/14* (2013.01);
(Continued)

(58) Field of Classification Search
CPC ........ B01D 63/14; B01D 39/20; B01D 39/16; B01D 46/10; B01D 2239/0627; B01D 71/36
See application file for complete search history.

(56) References Cited

U.S. PATENT DOCUMENTS 5,910,277 A * 6/1999 Ishino .................. B01D 39/083
264/127
6,261,979 B1 * 7/2001 Tanaka ............... B01D 67/0027
210/493.5
(Continued)

FOREIGN PATENT DOCUMENTS

EP 3 124 093 A1 2/2017
JP 61-132020 U 8/1986
(Continued)

OTHER PUBLICATIONS

International Preliminary Report on Patentability and the Written Opinion of the International Searching Authority (Forms PCT/IB338, PCT/IB/373 and PCT/ISA/237), dated Sep. 20, 2018, for Application No. PCT/JP2017/009229.
(Continued)

*Primary Examiner* — Anthony R Shumate
(74) *Attorney, Agent, or Firm* — Birch, Stewart, Kolasch & Birch LLP

(57) ABSTRACT

A filter medium for an air filter includes a pre-collection member, a first porous film, and a second porous film arranged in order from the side that is upstream of the air current. Each of the first porous film and the second porous film has a pressure loss of 30 Pa or more and 90 Pa or less when air is passed through each porous film at a flow rate of 5.3 cm/s, and has a collection efficiency of 95% or more and 99.9% or less for NaCl particles having a particle diameter of 0.3 μm when air containing the NaCl particles is passed through each of the porous films at a flow rate of 5.3 cm/s. The pre-collection member has a pressure loss of 5 Pa or more and less than 55 Pa when air is passed through the pre-collection member at a flow rate of 5.3 cm/s, has a collection efficiency of 15% or more and less than 85% for NaCl particles having a particle diameter of 0.3 μm when air containing the NaCl particles is passed through the pre-collection member at a flow rate of 5.3 cm/s, and has a thickness of more than 0.4 mm.

17 Claims, 5 Drawing Sheets

(51) Int. Cl.
*B01D 46/10* (2006.01)
*B01D 39/20* (2006.01)
*B01D 71/36* (2006.01)
*B01D 63/14* (2006.01)

(52) U.S. Cl.
CPC ...... *B01D 71/36* (2013.01); *B01D 2239/0627* (2013.01)

(56) References Cited

U.S. PATENT DOCUMENTS

| | | | | |
|---|---|---|---|---|
| 6,416,562 | B1* | 7/2002 | Shibuya | B01D 39/1623 55/486 |
| 6,682,576 | B1* | 1/2004 | Kiyotani | B01D 39/163 156/324 |
| 2003/0010210 | A1* | 1/2003 | Kawano | B01D 39/163 95/287 |
| 2003/0094102 | A1* | 5/2003 | Maeoka | A01N 25/10 96/226 |
| 2004/0168417 | A1* | 9/2004 | Tanaka | B01D 39/1692 55/486 |
| 2004/0195173 | A1* | 10/2004 | Huang | B01D 39/1692 210/490 |
| 2004/0237802 | A1* | 12/2004 | Tanaka | A01G 18/64 99/495 |
| 2010/0032368 | A1* | 2/2010 | Nagai | B01D 67/0034 210/506 |
| 2014/0130470 | A1* | 5/2014 | Mori | B01D 69/02 55/497 |
| 2014/0165517 | A1* | 6/2014 | Hara | B01D 46/10 55/486 |
| 2014/0196840 | A1* | 7/2014 | Ishii | B01D 71/36 156/244.11 |

FOREIGN PATENT DOCUMENTS

| | | |
|---|---|---|
| JP | 3-72908 A | 3/1991 |
| JP | 2004-188355 A | 7/2004 |
| JP | 2005-95803 A | 4/2005 |
| JP | 2005-169167 A | 6/2005 |
| JP | 2005-205305 A | 8/2005 |
| JP | 2005-246233 A | 9/2005 |
| JP | 2006-26531 A | 2/2006 |
| JP | 2008-55407 A | 3/2008 |
| JP | 2013-52320 A | 3/2013 |
| JP | 2013-63424 A | 4/2013 |
| JP | 2015-186772 A | 10/2015 |

OTHER PUBLICATIONS

International Search Report, issued in PCT/JP2017/009229, dated Apr. 11, 2017.

* cited by examiner

FILTER MEDIUM FOR AIR FILTER, FILTER PACK, AIR FILTER UNIT AND METHOD FOR PRODUCING THE FILTER MEDIUM FOR AIR FILTER

TECHNICAL FIELD

The present invention relates to a filter medium for an air filter, a filter pack, an air filter unit, and a method for producing the filter medium for an air filter.

BACKGROUND ART

As filter media for air filter meeting the criteria of an HEPA filter (High Efficiency Particulate Air Filter), filter media produced by using glass fibers called glass fiber filter media are known. While glass filter media of HEPA grade have a high collection efficiency, i.e., a collection efficiency of 99.97% for particles having a particle diameter of 0.3 µm, their pressure loss is high.

As HEPA filters with low pressure loss in place of such glass filter media, filter media using polytetrafluoroethylene (PTFE) porous film produced by stretching PTFE are known. Compared to glass filter media, PTFE porous films have high collection efficiency and low pressure loss, and excel in balancing collection efficiency and pressure loss.

For example, each of the following Patent Literature 1 (Japanese Laid-open Patent Publication No. 2013-52320) and Patent Literature 2 (Japanese Laid-open Patent Publication No. 2013-63424) proposes a filter medium for an air filter equipped with a melt-blown nonwoven fabric on the upstream side of a PTFE porous film, and further equipped with an air-permeable cover layer composed of a spunbond nonwoven fabric on the upstream side of the melt-blown nonwoven fabric, to reduce pressure loss of an air filter unit used while retained by a shape retaining member.

SUMMARY OF THE INVENTION

Technical Problem

In recent years, there has been a demand for increasing the dust holding capacity of filter media in order to extend the product life of the filter media. For example, when using an air filter unit for intake gas in a gas turbine, the air filter may clog before a periodic inspection of the gas turbine due to a small dust holding capacity of the air filter unit. When such clogging occurs, it is necessary to stop the operation of the gas turbine merely to exchange the air filter, which causes a great loss.

On the other hand, although an air filter disclosed in each of above Patent Literature 1 and Patent Literature 2 has high collection efficiency and low pressure loss, it has insufficient dust holding capacity, and there is a demand for still further improving the dust holding capacity.

The present invention is intended to provide a filter medium for an air filter, a filter pack, and an air filter unit, having not only high collection efficiency and low pressure loss, but also a high dust holding capacity, and a method for producing the filter medium for an air filter.

Solution to Problem

As a result of intensive research directed to solving the above problem, the inventors completed the present invention upon discovering that, by providing two layers of porous films mainly containing fluororesin, and a pre-collection member of specific physical properties on the upstream side, and by adopting the pre-collection member used along with two layers of porous films of specific physical properties having properties of specific pressure loss, collection efficiency, and thickness, it is possible to have not only high collection efficiency and low pressure loss, but also high dust holding capacity.

A filter medium for an air filter according to the first perspective is a filter medium for an air filter to collect dust in a gas, and includes a first porous film, a second porous film, and a pre-collection member. The first porous film mainly contains a fluororesin. The second porous film mainly contains a fluororesin and is arranged on the side that is downstream of the air current of the first porous film. The pre-collection member is arranged on the side that is upstream of the air current of the first porous film and configured to collect a portion of dust in the air current. Pressure loss of the first porous film is 30 Pa or more and 90 Pa or less when air is passed through the film at a flow rate of 5.3 cm/s, and collection efficiency of the first porous film for NaCl particles having a particle diameter of 0.3 µm when air containing the particles is passed through the film at a flow rate of 5.3 cm/s is 95% or more and 99.9% or less. Pressure loss of the second porous film is 30 Pa or more and 90 Pa or less when air is passed through the film at a flow rate of 5.3 cm/s, and collection efficiency of the first porous film for NaCl particles having a particle diameter of 0.3 µm when air containing the particles is passed through the film at a flow rate of 5.3 cm/s is 95% or more and 99.9% or less. Pressure loss of the pre-collection member is 5 Pa or more and less than 55 Pa when air is passed through the member at a flow rate of 5.3 cm/s, and collection efficiency of the pre-collection member for NaCl particles having a particle diameter of 0.3 µm when air containing the particles is passed through the member at a flow rate of 5.3 cm/s is 15% or more and less than 85%. Thickness of the pre-collection member is more than 0.4 mm.

When only one layer of the porous film made of fluororesin is equipped, collection efficiency required of the pre-collection member rises in order to enhance the collection efficiency of the entire filter medium for an air filter. As such, when the collection efficiency of the pre-collection member is too high, pressure loss of the pre-collection member rises and clogging is liable to occur earlier. Then, it is difficult to enhance the dust holding capacity of the entire filter medium for an air filter.

On the other hand, this filter medium for an air filter has at least two porous films, i.e., the first porous film and the second porous film, as porous films made of fluororesin and as porous films with specific properties, and therefore the dust holding capacity of the entire filter medium for an air filter can be readily enhanced. Moreover, since the filter medium for an air filter has at least two porous films made of fluororesin, i.e., the first porous film and the second porous film, it is possible to keep the collection efficiency required of a pre-collection member at a low level, when attempting to enhance the collection efficiency of the entire filter medium for an air filter, and the possibility of early clogging of the pre-collection member can be decreased.

Moreover, since the pre-collection member has a collection efficiency within a specific range and has a thickness of more than 0.4 mm, it is possible to capture relatively large collecting targets throughout the member in the entire thickness direction without locally increasing the density of the pre-collection member. As such, the pre-collection member is capable not only of capturing collecting targets so as to ease the collecting load of the first and second porous films, but also of making early clogging of the pre-collection member less liable.

Further, when using a pre-collection member having a relatively high collection efficiency per unit of thickness and having a relatively large thickness, its collection efficiency is less than 85%. As such, it is possible to make early clogging of the pre-collection member less likely to occur.

Accordingly, it is possible to control both the early clogging of the pre-collection member and the early cloggings of the first and second porous films, and therefore this filter medium for an air filter is capable not only of having high collection efficiency and low pressure loss, but also of having large dust holding capacity.

A filter medium for an air filter according to the second perspective is the filter medium for an air filter according to the first perspective, where the pre-collection member is constituted by a glass fiber-filter medium.

In this filter medium for an air filter, the pre-collection member is constituted by a glass fiber-filter medium, and the glass fiber-filter medium is a material that is difficult to be electrically charged. As such, by using the pre-collection member constituted by the glass fiber-filter medium that is difficult to be electrically charged in combination with the first porous film and the second porous film, it is possible to reduce the risk of making a hole in the first porous film or in the second porous film by a spark generated by static electric charge, compared to the case of using a pre-collection member made of another material that is prone to be electrically charged (for example, a melt-blown nonwoven fabric or the like). Further, supposing that a melt-blown nonwoven fabric or the like that is prone to be electrically charged is used as a pre-collection member, the pre-collection member may unintentionally be electrically charged and the collection efficiency of the pre-collection member may be enhanced, causing early clogging of the pre-collection member itself to occur, thereby the dust holding capacity of the entire filter medium for an air filter may not be enhanced. However, a glass fiber-filter medium that is difficult to be electrically charged is used here, and therefore such problem can be reduced.

A filter medium for an air filter according to the third perspective is the filter medium for an air filter according to the first perspective or the second perspective, where the thickness of the pre-collection member is 0.8 mm or less.

In this filter medium for an air filter, the thickness of the pre-collection member is 0.8 mm or less, and therefore the folding operation when the filter medium for an air filter is folded to create pleats is facilitated.

A filter medium for an air filter according to the fourth perspective is the filter medium for an air filter according to any one of the first perspective to the third perspective, where the dust holding capacity of the filter medium for an air filter for polyalphaolefin particles having a count median particle diameter of 0.25 µm is 50 g/m$^2$ or more when air containing the polyalphaolefin particles is continuously passed through the filter medium at a flow rate of 5.3 cm/s and the pressure loss is increased by 250 Pa. Moreover, the dust holding capacity of the filter medium for an air filter for NaCl particles having a count median particle diameter of 0.1 µm is 5.0 g/m$^2$ or more when air containing the NaCl particles is continuously passed through the filter medium at a flow rate of 5.3 cm/s and the pressure loss is increased by 250 Pa.

In this filter medium for an air filter, a dust holding capacity of 50 g/m$^2$ or more is ensured for polyalphaolefin particles having a count median particle diameter of 0.25 µm, and a dust holding capacity of 5.0 g/m$^2$ or more is ensured for NaCl particles having a count median particle diameter of 0.1 µm. As such, either in the case of having liquid particles with a relatively large particle diameter such as polyalphaolefin having a particle diameter mentioned above as a collecting target, or in the case of having solid particles with a relatively small particle diameter such as NaCl having a particle diameter mentioned above as a collecting target, it is possible to ensure sufficient dust holding capacity. Thereby, even for a target where solid particles and liquid particles are mixed together, it is possible to ensure clogging resistance and high dust holding capacity.

A filter medium for an air filter according to the fifth perspective is the filter medium for an air filter according to any one of the first perspective to the fourth perspective, where the dust holding capacity of the first porous film for polyalphaolefin particles having a count median particle diameter of 0.25 µm is 20 g/m$^2$ or more and 35 g/m$^2$ or less when air containing the polyalphaolefin particles is continuously passed through the porous film at a flow rate of 5.3 cm/s and the pressure loss is increased by 250 Pa. Moreover, the dust holding capacity of the second porous film for polyalphaolefin particles having a count median particle diameter of 0.25 µm is 20 g/m$^2$ or more and 35 g/m$^2$ or less when air containing the polyalphaolefin particles is continuously passed through the porous film at a flow rate of 5.3 cm/s and the pressure loss is increased by 250 Pa.

This filter medium for an air filter is capable not only of having high collection efficiency and low pressure loss, but also of further enhancing dust holding capacity.

A filter medium for an air filter according to the sixth perspective is the filter medium for an air filter according to any one of the first perspective to the fifth perspective, where an upstream air permeable supporting material is further equipped. The upstream air permeable supporting material is arranged on the side that is upstream of the air current of the first porous film, and supports the first porous film.

Note that, the pre-collection member has only to be arranged on the side that is upstream of the air current of the first porous film, and may be arranged on the side that is upstream of the air current of the upstream air permeable supporting material, or may be arranged on the side that is downstream of the air current of upstream air permeable supporting material.

The strength of this filter medium for an air filter on the upstream side can be enhanced.

A filter medium for an air filter according to the seventh perspective is the filter medium for an air filter according to any one of the first perspective to the sixth perspective, where a downstream air permeable supporting material is further equipped. The downstream air permeable supporting material is arranged on the side that is downstream of the air current of the second porous film, and supports the second porous film.

The strength of this filter medium for an air filter on the downstream side can be enhanced.

A filter medium for an air filter according to the eighth perspective is the filter medium for an air filter according to any one of the first perspective to the seventh perspective, where the pressure loss of the first porous film is less than that of the second porous film when air is passed through each of the porous films at a flow rate of 5.3 cm/s, and the collection efficiency of the second porous film is higher than that of the first porous film when air containing NaCl particles having a particle diameter of 0.3 µm is passed through each of the porous films at a flow rate of 5.3 cm/s.

This filter medium for an air filter is capable not only of having high collection efficiency and low pressure loss, but also of further enhancing dust holding capacity.

A filter medium for an air filter according to the ninth perspective is the filter medium for an air filter according to any one of the first perspective to the eighth perspective, where the first porous film and the second porous film primarily include fiberizable polytetrafluoroethylene, a non-fiberizable non-heat melt processable component, and a non-fiberizable heat melt processable component having a melting point of less than 320° C.

A conventional PTFE porous film that is primarily constituted only by fiberizable PTFE (high molecular weight PTFE) contains many fine fibrils with a small fiber diameter, and while the surface area per fiber is large and the collection efficiency is high, the film thickness is relatively thin, and there is a large amount of overlaps of fibers with one another. Therefore, it is not possible to dust hold many microparticles, and high collection efficiency per fiber is not effectively exhibited.

On the other hand, this filter medium for an air filter is primarily constituted by three components, namely fiberizable polytetrafluoroethylene, a non-fiberizable non-heat melt processable component, and a non-fiberizable heat melt processable component having a melting point less than 320° C., and therefore it is possible to enhance the dust holding capacity by increasing voids using relatively thick fibers to increase the film thickness compared to the conventional PTFE porous films.

A filter medium for an air filter according to the tenth perspective is the filter medium for an air filter according to any one of the first perspective to the ninth perspective, where the pressure loss of the filter medium for an air filter is less than 200 Pa when air is passed through the filter medium at a flow rate of 5.3 cm/s, and the collection efficiency of the filter medium for NaCl particles having a particle diameter of 0.3 μm is 99.97% or more when air containing the NaCl particles is passed through the filter medium at a flow rate of 5.3 cm/s.

An air filter pack according to the eleventh perspective includes the filter medium for an air filter according to any one of the first perspective to the tenth perspective, and is constituted by processing the filter medium for an air filter so as to form a zigzag configuration by repeating mountain folds and valley folds in an alternating fashion. Note that the "filter pack" has no particular limitations. However, for example, it is not of a flat sheet shape, but has a zigzag configuration produced by alternate folding into mountain folds and valley folds, and it may be shaped to be accommodated in an optional frame.

An air filter pack according to the twelfth perspective includes the filter medium for an air filter according to any one of the first perspective to the tenth perspective or the filter pack according to the eleventh perspective, and a frame to retain the filter medium for an air filter or the filter pack.

A method for producing a filter medium for an air filter according to the thirteenth perspective is a method for producing a filter medium for an air filter to collect dust in a gas, comprising a step of obtaining a first porous film and a second porous film primarily containing a fluororesin, a step of arranging the first porous film on the side that is upstream of an air stream of the second porous film, and a step of arranging a pre-collection member on the side that is upstream of the air current of the first porous film so as to collect a portion of the dust in the air current. The pressure loss of the first porous film is 30 Pa or more and 90 Pa or less when air is passed through the porous film at a flow rate of 5.3 cm/s, and the collection efficiency of the first porous film for NaCl particles having a particle diameter of 0.3 μm is 95% or more and 99.9% or less when air containing the NaCl particles is passed through the porous film at a flow rate of 5.3 cm/s. The pressure loss of the second porous film is 30 Pa or more and 90 Pa or less when air is passed through the porous film at a flow rate of 5.3 cm/s, and the collection efficiency of the second porous film for NaCl particles having a particle diameter of 0.3 μm is 95% or more and 99.9% or less when air containing the NaCl particles is passed through the porous film at a flow rate of 5.3 cm/s. The pressure loss of the pre-collection member is 5 Pa or more and less than 55 Pa when air is passed through the pre-collection member at a flow rate of 5.3 cm/s, and the collection efficiency of the pre-collection member for NaCl particles having a particle diameter of 0.3 μm is 15% or more and less than 85% when air containing the NaCl particles is passed through the pre-collection member at a flow rate of 5.3 cm/s. The thickness of the pre-collection member is more than 0.4 mm. This method for production further comprises a step of integrating the first porous film, the second porous film, and the pre-collection member by heat lamination.

According to this method for producing a filter medium for an air filter, it is possible to obtain a filter medium for an air filter having not only high collection efficiency and low pressure loss, but also high dust holding capacity, similarly to the filter medium for an air filter according to the first perspective.

A method for producing a filter medium for an air filter according to the fourteenth perspective is the method for producing a filter medium for an air filter according to the thirteenth perspective, the method further comprising a step of arranging an upstream air permeable supporting material that supports the first porous film on the side that is upstream of the air current of the first porous film.

It should be noted that the pre-collection member has only to be arranged on the side that is upstream of the air current of the first porous film, and may be arranged on the side that is upstream of the air current of the upstream air permeable supporting material, or may be arranged on the side that is downstream of the air current of the upstream air permeable supporting material.

According to this method for producing a filter medium for an air filter, the strength of the obtained filter medium for an air filter on the upstream side can be enhanced.

A method for producing a filter medium for an air filter according to the fifteenth perspective is the method for producing a filter medium for an air filter according to the thirteenth perspective or the fourteenth perspective, the method further comprising a step of arranging a downstream air permeable supporting material that supports the second porous film on the side that is downstream of the air current of the second porous film.

According to this method for producing a filter medium for an air filter, the strength of the obtained filter medium for an air filter on the downstream side can be enhanced.

Advantageous Effects of Invention

Using the filter medium for an air filter, the filter pack, or the air filter unit according to the present invention, it is possible to have not only high collection efficiency and low pressure loss, but also high dust holding capacity.

Further, using the method for producing a filter medium for an air filter according to the present invention, it is possible to obtain a filter medium for an air filter having not only high collection efficiency and low pressure loss, but also high dust holding capacity.

DESCRIPTION OF EMBODIMENTS

A filter medium for an air filter (hereinafter also simply called a "filter medium"), a filter pack, an air filter unit, and a method for producing the filter medium for an air filter are described below using embodiments as examples.

(1) Filter Medium for an Air Filter

Figure 1:
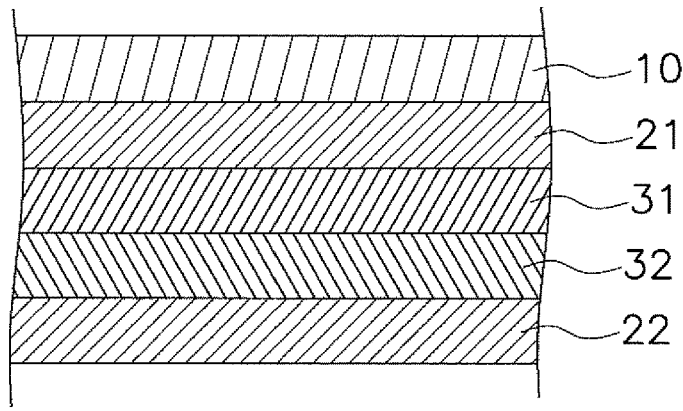
FIG. 1 is a schematic cross sectional view showing a layer constitution of a filter medium having a 5-layer structure according to the present embodiment.

FIG. 1 shows a schematic cross sectional view of a filter medium for an air filter 1 having a 5-layer structure according to the present embodiment.

The filter medium for an air filter 1 is a filter medium for an air filter for collecting dust in a gas, and includes a pre-collection member 10, an optional upstream air permeable supporting material 21, a first porous film 31, a second porous film 32, and an optional downstream air permeable supporting material 22, in the order from the side that is upstream of an air current.

The first porous film 31 primarily contains fluororesin. The second porous film 32 primarily contains fluororesin, and is arranged on the side that is downstream of the air current of the first porous film 31 so as to be mutually adjacent to the first porous film. The upstream air permeable supporting material 21 is arranged on the side that is upstream of the air current of the first porous film 31, and supports the first porous film 31. The downstream air permeable supporting material 22 is arranged on the side that is downstream of the air current of the second porous film 32, and supports the second porous film 32. The pre-collection member 10 is arranged on the side that is upstream of the air current of the first porous film 31 (on the side that is upstream of the air current of the upstream air permeable supporting material 21 in the present embodiment), and collects a portion of the dust in the air current.

The pressure loss of each of the first porous film 31 and the second porous film 32 is 30 Pa or more and 90 Pa or less when air passes through each porous film at a flow rate of 5.3 cm/s, and the collection efficiency of each of the first porous film and the second porous film for NaCl particles having a particle diameter of 0.3 µm is 95% or more and 99.9% or less when air containing the NaCl particles passes through each porous film at a flow rate of 5.3 cm/s.

The pressure loss of the pre-collection member 10 is 5 Pa or more and less than 55 Pa when air passes through the pre-collection member 10 at a flow rate of 5.3 cm/s, and the collection efficiency of the pre-collection member 10 for NaCl particles having a particle diameter of 0.3 µm is 15% or more and less than 85% when air containing the NaCl particles passes through the pre-collection member 10. The thickness of the pre-collection member 10 is more than 0.4 mm.

Each layer and the relationship between layers are specifically described below.

(2) Porous Films

The pressure loss of the first porous film 31 is 30 Pa or more and 90 Pa or less when air passes through the porous film at a flow rate of 5.3 cm/s, and the collection efficiency of the first porous film 31 for NaCl particles having a particle diameter of 0.3 µm is 95% or more and 99.9% or less when air containing the NaCl particles passes through the porous film at a flow rate of 5.3 cm/s.

Moreover, similarly, the pressure loss of the second porous film 32 is 30 Pa or more and 90 Pa or less when air passes through the porous film at a flow rate of 5.3 cm/s, and the collection efficiency of the second porous film 32 for NaCl particles having a particle diameter of 0.3 µm is 95% or more and 99.9% or less when air containing the NaCl particles passes through the porous film at a flow rate of 5.3 cm/s.

Moreover, each of the first porous film 31 and the second porous film 32 is constituted by primarily containing fluororesin, and has a porous film structure which has fibrils (fibers) and nodes (nodal portions) connected to the fibrils not shown in the Figures.

Here, "primarily" means that when more than one type of component is contained, the amount of fluororesin contained is the largest. Each of the first porous film 31 and the second porous film 32 may, for example, contain fluororesin exceeding 50 wt. % of the entire porous film. In other words, each of the first porous film 31 and the second porous film 32 may contain less than 50 wt. % of a component other than fluororesin.

An example of a component other than fluororesin may be an inorganic filler which is a non-fiberizable non-melt processable component (component B) described later. The first porous film 31 is arranged on the side that is upstream side of the air current (the upper portion of FIG. 1) and the second porous film 32 is arranged on the side that is downstream of the air current of the first porous film 31 (the lower portion in FIG. 1).

The first porous film 31 and the second porous film 32 may have the same film structure with each other or may have a different film structure from each other.

The fluororesin used in the first porous film 31 and the second porous film 32 may be composed of one type of component or may be composed of two or more types of components. Moreover, as an example of the fluororesin composed of two or more types of components, there is a mixture of three components, i.e., an fiberizable PTFE (hereafter also called "component A"), a non-fiberizable non-heat melt processable component (hereafter also called "component B"), and a non-fiberizable heat melt processable component having a melting point less than 320° C. (hereafter also called component C). The first porous film 31 preferably is composed of a combination of these three types of components. Compared to the conventional fiberizable PTFE (high molecular weight PTFE) porous films, the first porous film 31 composed of these three types of components has a film structure with many voids and large film thickness, and microparticles in air can be collected in a broad area in the thickness direction of a filter media, and thereby the dust holding capacity can be improved. By constituting a porous film with these three types of components, it is possible to particularly increase a dust holding capacity for liquid particles rather than solid particles. From such perspective, it is more preferable to have not only the first porous film 31, but both the first porous film 31 and the second porous film 32 composed of these three types of components. Thereby, thickness of the entire filter medium 1 can be ensured, and the dust holding capacity further improves.

The three types of components mentioned above will be described below in more detail. Note that the contents applicable to both the first porous film 31 and the second porous film 32 will be described simply under the expression "porous film" without being differentiated.

(2-1) Component A: Fiberizable PTFE

The fiberizable PTFE, for example, is a high molecular weight PTFE obtained from emulsion polymerization or suspension polymerization of tetrafluoroethylene (TFE). A high molecular weight as used herein means a molecular weight of a magnitude such that fiberization readily occurs during stretching when forming a porous film and fibrils with large fiber length are obtained, and the PTFE has a standard specific gravity (SSG) of 2.130 to 2.230 and has a high melt viscosity so that substantially no melt flow occurs. From the perspective of being readily fiberized and being able to obtain fibrils with large fiber length, the SSG of the fiberizable PTFE is preferably 2.130 to 2.190, and more preferably 2.140 to 2.170. When the SSG is too high, there is a risk that the stretching properties of a mixture of components A to C deteriorates, and when the SSG is too low, the rolling properties and then the homogeneity of the porous film deteriorate to raise the risk of increasing a pressure loss of the porous film. Moreover, from the perspective of being readily fiberized and being able to obtain fibrils with large fiber length, a PTFE obtained by emulsion polymerization is preferable. The standard specific gravity (SSG) is measured in accordance with ASTM D 4895.

The presence or absence of fiberization properties, i.e., whether or not a substance can be fiberized, can be determined by whether paste extrusion, which is a typical method for molding a high-molecular weight PTFE powder made from polymers of TFE, is possible. Normally, paste extrusion is possible because a high-molecular weight PTFE has fiberization properties. In the case where an unbaked molded body obtained by paste extrusion has no substantial strength or stretch, for example, in the case where stretch is 0% and the molded body snaps when pulled, the molded body can be considered to lack fiberization properties.

The high-molecular weight PTFE mentioned above may be a modified polytetrafluoroethylene (hereinafter called "modified PTFE"), a homo-polytetrafluoroethylene (hereinafter called "homo-PTFE"), or a mixture of modified PTFE and homo-PTFE. There are no particular limitations to the homo-PTFE, and homo-PTFEs disclosed in Japanese Laid-open Patent Publication No. S53-60979, Japanese Laid-open Patent Publication No. S57-135, Japanese Laid-open Patent Publication No. S61-16907, Japanese Laid-open Patent Publication No. S62-104816, Japanese Laid-open Patent Publication No. S62-190206, Japanese Laid-open Patent Publication No. S63-137906, Japanese Laid-open Patent Publication No. 2000-143727, Japanese Laid-open Patent Publication No. 2002-201217, WO2007/046345, WO2007/119829, WO2009/001894, WO2010/113950, WO2013/027850 and others can be preferably used. In particular, homo-PTFEs having high stretching properties disclosed in Japanese Laid-open Patent Publication No. S57-135, Japanese Laid-open Patent Publication No. S63-137906, Japanese Laid-open Patent Publication No. 2000-143727, Japanese Laid-open Patent Publication No. 2002-201217, WO2007/046345, WO2007/119829, WO2010/113950 and others are preferable.

A modified PTFE is constituted of TFE and a monomer other than TFE (hereinafter called a "modified monomer"). Examples of the modified PTFE include, but are not particularly limited to, those uniformly modified by a modified monomer, those modified in the initial phase of a polymerization reaction, those modified in the final phase of a polymerization reaction and the like. The modified PTFEs disclosed, for example, in Japanese Laid-open Patent Publication No. S60-42446, Japanese Laid-open Patent Publication No. S61-16907, Japanese Laid-open Patent Publication No. S62-104816, Japanese Laid-open Patent Publication No. S62-190206, Japanese Laid-open Patent Publication No. S64-1711, Japanese Laid-open Patent Publication No. H02-261810, Japanese Laid-open Patent Publication No. H11-240917, Japanese Laid-open Patent Publication No. H11-240918, WO2003/033555, WO2005/061567, WO2007/005361, WO2011/055824, WO2013/027850 and others can be preferably used. In particular, modified PTFEs having high stretching properties disclosed in Japanese Laid-open Patent Publication No. S61-16907, Japanese Laid-open Patent Publication No. S62-104816, Japanese Laid-open Patent Publication No. S64-1711, Japanese Laid-open Patent Publication No. H11-240917, WO2003/033555, WO2005/061567, WO2007/005361, WO2011/055824 and others are preferable.

The modified PTFE includes TFE units based on TFE, and modified monomer units based on a modified monomer. The modified monomer units are a portion of a molecular structure of the modified PTFE, and a portion derived from the modified monomer. The modified PTFE preferably includes modified monomer units in an amount of 0.001 to 0.500 wt. % of the entire monomer units, and more preferably includes 0.01 to 0.30 wt. %. The entire monomer units are a portion derived from the entire monomers in a molecular structure of the modified PTFE.

There are no particular limitations to the modified monomer as long as copolymerization with TFE is possible, and examples include perfluoroolefins such as hexafluoropropylene (HFP), chlorofluoroolefins such as chlorotrifluoroethylene (CTFE), hydrogen-containing fluoroolefins such as trifluoroethylene and vinylidene fluoride (VDF), perfluorovinyl ether, perfluoroalkyl ethylene (PFAE), ethylene and others. The modified monomer used may be one type or it may be more than one type.

There are no particular limitations to the perfluorovinyl ether, and examples include a perfluoro unsaturated compound and the like represented by following general formula (1).

$$CF_2=CF-ORf \quad (1)$$

wherein Rf represents a perfluoro organic group.

In the present specification, the perfluoro organic group is an organic group formed by substituting all hydrogen atoms bonded to a carbon atom with fluorine atoms. The perfluoro organic group mentioned above may have an ether oxygen.

Examples of the perfluorovinyl ether include perfluoro (alkyl vinyl ether) (PAVE) where Rf in the above general formula (1) is a C1-10 perfluoroalkyl group. The carbon number of the perfluoroalkyl group is preferably 1 to 5. Examples of the perfluoroalkyl group in PAVE include a perfluoromethyl group, perfluoroethyl group, perfluoropropyl group, perfluorobutyl group, perfluoropentyl group, perfluorohexyl group and others. Examples of PAVE preferably include perfluropropyl vinyl ether (PPVE) and perfluoromethyl vinyl ether (PMVE).

There are no particular limitations to the perfluoroalkyl ethylene (PFAE) mentioned above, and examples include perfluorobutyl ethylene (PFBE), perfluorohexyl ethylene (PFHE) and the like.

The modified monomer in the modified PTFE is preferably at least one type selected from the group consisting of HFP, CTFE, VDF, PAVE, PFAE, and ethylene.

From the perspective in particular of being readily fiberized and being able to obtain fibrils with large fiber length, the homo-PTFE is preferably contained in an amount exceeding 50 wt. % of the fiberizable PTFE.

Note that the fiberizable PTFE may be a combination of more than one component mentioned above.

From the perspective of maintaining the fiber structure of a porous film, the fiberizable PTFE is preferably contained in an amount exceeding 50 wt. % of the porous film.

(2-2) Component B: Non-Fiberizable Non-Heat Melt Processable Component

The non-fiberizable non-heat melt processable component is unevenly present as non-fiber particles primarily in the nodes, and works not to fiberize the fiberizable PTFE.

Examples of the non-fiberizable non-heat melt processable component include components having thermoplasticity such as low-molecular weight PTFE, thermosetting resins, inorganic fillers, and mixtures thereof.

The components having thermoplasticity have melting points of 320° C. or higher, and preferably have high melt viscosities. For example, low-molecular weight PTFE has high melt viscosity, and therefore it can remain in the nodes even when processed at temperatures above the melting point. As used in the present specification, low-molecular weight PTFE is PTFE having a number-average molecular weight of 600,000 or less, a melting point of 320° C. or higher and 335° C. or lower, and a melt viscosity of 100 Pa·s to $7.0 \times 10^5$ Pa·s at 380° C. (see Japanese Laid-open Patent Publication No. H10-147617).

Examples of the method for producing the low-molecular weight PTFE include a method that involves contacting and reacting a high-molecular weight PTFE powder (molding powder) obtained by suspension polymerization of TFE, or a high-molecular weight PTFE powder (fine powder) obtained by emulsion polymerization of TFE with a specific fluoride under high temperature to induce a thermal decomposition (see Japanese Laid-open Patent Publication No. S61-162503), a method of irradiating the high molecular weight PTFE powder mentioned above or a molded body with ionizing radiation (see Japanese Laid-open Patent Publication No. S48-78252), and a method that involves direct polymerization of TFE together with a chain transfer agent (see WO2004/050727, WO2009/020187, and WO2010/114033). Similarly to the fiberizable PTFE, the low-molecular weight PTFE may be homo-PTFE, or may be a modified PTFE containing the modified monomer mentioned above.

The low-molecular weight PTFE lacks fiberization properties. The presence or absence of fiberization properties can be determined by the method mentioned above. Low-molecular weight PTFE, in the form of an unbaked molded body obtained by paste extrusion, has no substantial strength or stretch, and, for example, has 0% stretch, and snaps when pulled.

While there are no particular limitations to the low-molecular weight PTFE, its melt viscosity at 380° C. is preferably 1,000 Pa·s or higher, more preferably 5,000 Pa·s or higher, and even more preferably 10,000 Pa·s or higher. With such high melt viscosity, the non-fiberizable non-heat melt processable component can remain in the nodes when producing porous films, even if the heat melt processable component that is not fiberized as component C melts, and fiberization can be minimized.

Examples of the thermosetting resin include resins of epoxy, silicone, polyester, polyurethane, polyimide, phenol, mixtures thereof and the like. From the perspective of workability in co-coagulation discussed below, a resin dispersed in water in an uncured state is desirably used as the thermosetting resin. Such thermosetting resins are all commercially available.

Examples of the inorganic filler include talc, mica, calcium silicate, glass fibers, calcium carbonate, magnesium carbonate, carbon fibers, barium sulfate, calcium sulfate, mixtures thereof and the like. In particular, from the perspective of affinity to fiberizable high molecular weight PTFE and specific gravity, talc is preferably used. From the perspective of being able to form a stable dispersion when producing porous films, an inorganic filler having a particle diameter of 3 μm or more and 20 μm or less is preferably used. The particle diameter is an average particle diameter and is measured by the laser diffraction and scattering method. These inorganic fillers are all commercially available.

Note that the non-fiberizable non-heat melt processable component may also be a combination of more than one component mentioned above.

The non-fiberizable non-heat melt processable component is preferably contained in an amount of 1 wt. % or more and 50 wt. % or less of a porous film. By keeping the non-fiberizable non-heat melt processable component content to not more than 50 wt. %, the fiber structure of the porous film can be easily maintained. The non-fiberizable non-heat melt processable component is preferably contained in an amount of 20 wt. % or more and 40 wt. % or less, and more preferably in an amount of 30 wt. %. By containing the non-fiberizable non-heat melt processable component in an amount of 20 wt. % or more and 40 wt. % or less, fiberization of fiberizable PTFE can be more effectively minimized.

(2-3) Component C: Non-Fiberizable Heat Melt Processable Component Having a Melting Point Less than 320° C.

The non-fiberizable heat melt processable component having a melting point of less than 320° C. (hereafter also called a "non-fiberizable heat melt processable component") has fluidity when it melts, and therefore it can melt and solidify in the nodes when producing (stretching) a porous film, thereby enhancing the strength of the entire porous film to reduce deterioration of the filter performance, even if the porous film undergoes compression, etc. in subsequent steps.

The non-fiberizable heat melt processable component preferably exhibits a melt viscosity of less than 10,000 Pa·s at 380° C. Further, the melting point of the non-fiberizable heat melt processable component is the peak top of a heat-of-melting curve obtained by increasing the temperature of the component to or above the melting point at a heating rate of 10° C./min with a differential scanning calorimeter (DSC) to completely melt the component, cooling the component to or below the melting point at a cooling rate of 10° C./min, and then heating the component again at a heating rate of 10° C./min.

Examples of the non-fiberizable heat melt processable component include hot-melt-processable resins of fluoropolymers, polystyrene, polyethylene terephthalate (PET), polyester, polyamide, and the like, or mixtures thereof, which are capable of sufficiently exhibiting meltability and fluidity at the stretching temperature when producing porous films. In particular, from the perspsctive of having excellent heat resistance at the stretching temperature when producing porous films and having excellent chemical resistance, a hot-melt-processable fluoropolymer is preferable. Examples of the hot-melt-processable fluoropolymer include a fluoropolymer containing copolymer units derived from at least one, and preferably two or more, fluorinated unsaturated ethylene monomers represented by the following general formula (2):

$$RCF=CR_2 \qquad (2)$$

wherein, each R is independently selected from H, F, Cl, C1-8 alkyl, C6-8 aryl, C3-10 cycloalkyl, and C1-8 perfluoroalkyl, and wherein all Rs may be the same, any two Rs may be the same while the remaining R is different, or all Rs may be different from one another.

Useful examples of the compounds represented by the general formula (2) include, but are not limited to, perfluoroolefins such as fluoroethylene, VDF, trifluoroethylene, TFE, HEP and the like, chlorofluoroolefins such as CTFE, dichlorodifluoroethylene and the like, (perfluoroalkyl) ethylene such as PFBE, PFHE and the like, perfluoro-1,3-dioxole, mixtures thereof and the like.

Moreover, the fluoropolymer may also include a copolymer derived from copolymerization of at least one type of a monomer represented by the general formula (2) mentioned above, and at least one type of a copolimerizable comonomer represented by the general formula (1) mentioned above and/or general formula (3) mentioned below:

$$R_2C=CR_2 \qquad (3)$$

wherein, R is independently selected from H, Cl, C1-8 alkyl, C6-8 aryl, and C3-10 cycloalkyl, wherein all Rs may be the same, any two or more Rs may be the same while the remaining other R(s) is(are) different, or all Rs may be different from one another, and wherein the remaining other Rs, when there are more than one R, may be different from one another.

Useful examples of a compound represented by the general formula (1) include perfluoro(alkyl vinyl ethers) (PAVE). Examples of the PAVE preferably include perfluoropropyl vinyl ether (PPVE) and perfluoromethyl vinyl ether (PMVE).

Useful examples of a compound represented by the general formula (3) include ethylene, propylene and the like.

More specific examples of the fluoropolymer include polyfluoroethylene derived from polymerization of fluoroethylene, polyvinylidene fluoride (PVDF) derived from polymerization of vinylidene fluoride (VDF), polychlorotrifluoroethylene (PCTFE) derived from polymerization of chlorotrifluoroethylene (CTFE), fluoropolymers derived from copolymerization of two or more different monomers represented by the above general formula (2), and fluoropolymers derived from copolymerization of at least one type of monomer represented by the above general formula (2), and at least one type of monomer represented by the above general formula (1) and/or at least one type of monomer represented by the above general formula (3).

Examples of such polymers are polymers having copolymer units derived from VDF and hexafluoropropylene (HFP), and polymers derived from TFE and at least one copolymerizable comonomer (at least 3 wt. %) other than TFE. Examples of fluoropolymers of the latter type include TFE/PAVE copolymer (PFA), TFE/PAVE/CTFE copolymer, TFE/HFP copolymer (FEP), TFE/ethylene copolymer (ETFE), TFE/HFP/ethylene copolymer (EFEP), TFE/VDF copolymer, TFE/VDF/HFP copolymer, TFE/VDF/CTFE copolymer, and the like, or mixtures thereof.

Note that the non-fiberizable heat melt processable component may also be a combination of more than one of the components mentioned above.

Content of the non-fiberizable heat melt processable component in the porous film is preferably 0.1 wt. % or more and less than 20 wt. %. By keeping the content of the non-fiberizable heat melt processable component to less than 20 wt. %, the component diffuses into portions other than the nodes within the porous film, and minimizes the pressure loss of the porous film to rise. Moreover, by keeping the content of the non-fiberizable heat melt processable component to less than 20 wt. %, it is easy to conduct stretching at a high elongation area magnification of 40 or higher as discussed below. By keeping the content of the non-fiberizable heat melt processable component in the porous film to 0.1 wt. % or more, deterioration of the filter performance of the porous film can be sufficiently reduced even if compression force and others are exerted in subsequent steps. The content of the non-fiberizable heat melt processable component in the porous film is preferably 15 wt. % or less, and more preferably 10 wt. % or less. Moreover, from the perspective of ensuring strength of the porous film, the content of the non-fiberizable heat melt processable component in the porous film is preferably 0.5 wt. % or more. In particular, it is preferably in the order of 5 wt. %.

The content of the non-fiberizable heat melt processable component is preferably 10 wt. % or less in order to conduct stretching well at an elongation area magnification of 40 or more and 800 or less.

In the porous film composed of the three types of components mentioned above, the fibrils primarily include component A, and the nodes comprise components A to C. Such nodes are formed relatively large in the porous film, and thereby a porous film with a large thickness is formed. Moreover, such nodes are relatively hard due to containing the non-fiberizable heat melt processable component, and function like pillars supporting the porous film in the thickness direction, and therefore it is possible to reduce deterioration of filtering performance of the porous film even if compression force and others are exerted in the thickness direction in subsequent steps such as laminating an air-permeable supporting material or a pleating process described hereafter.

(2-4) Other Properties of the Porous Films

Each of the first porous film 31 and the second porous film 32 preferably has a filling rate found according to the following formula of 1% or higher and 20% or lower, and more preferably 2% or higher and 10% or lower.

Filling rate (%)={1−(void volume in porous film/volume of porous film)}×100

The average pore diameter of each of the first porous film 31 and the second porous film 32 preferably exceeds 1.6 µm, and more preferably the average pore diameter of the first porous film 31 is 3.0 µm or more and 3.9 µm or less, and the average pore diameter of the second porous film 32 is more than 1.6 µm and less than 3.0 µm. Thereby, it is easier to have the dust holding capacity of the first porous film 31 be larger than the dust holding capacity of the second porous film 32, and it is easier to improve the dust holding capacity of the entire filter medium 1.

The average pore diameter is measured in compliance with ASTM F316-86. The average pore diameter is also called the average flow channel diameter.

From the perspective of enhancing the dust holding capacity and the collection efficiency, the film thickness of the first porous film 31 preferably exceeds 10 μm, and more preferably exceeds 40 μm. The upper limit value of the film thickness of the first porous film 31 is not particularly limited, and, for example, may be 100 μm. Moreover, for example, when the second porous film 32 contains the three types of components mentioned above, the film thickness of the second porous film 32 preferably exceeds 10 μm, and more preferably exceeds 40 μm. The upper limit value of the film thickness of the second porous film 32 is not particularly limited, but, for example, may be 100 μm.

Five measuring targets, i.e., films, were stacked on one over another and the film thickness of the entire films was measured. The value obtained was divided by 5 and the resulting value was regarded as the film thickness.

The dust holding capacity of the first porous film 31 and that of the second porous film 32 may be the same or they may be different. From the perspective of significantly improving the dust holding capacity of the filter medium 1 while keeping the collection efficiency of the filter medium 1 high, it is preferable to differentiate the dust holding capacity of the first porous film 31 from the dust holding capacity of the second porous film 32 such that the dust holding capacity of the first porous film 31 is larger than the dust holding capacity of the second porous film 32.

Note that the dust holding capacity of the first porous film 31 or the second porous film 32 means a dust holding capacity for polyalphaolefin (PAO) particles having a count median particle diameter of 0.25 μm when air containing the polyalphaolefin particles is continuously passed through the porous film at a flow rate of 5.3 cm/s and the pressure loss is raised by 250 Pa, and may simply be referred to as the dust holding capacity in the following descriptions regarding features of the first porous film 31 or the second porous film 32.

A comparison between the dust holding capacity of the first porous film 31 and the dust holding capacity of the second porous film 32, for example, may be performed using the average value of the dust holding capacities measured at 10 to 50 locations of one porous film. The dust holding capacity at each measuring location is measured according to the manner described below using polyalphaolefin particles. There is no particular limitation, but the dust holding capacity of the first porous film 31 is, for example, 20 g/m$^2$ or more and 35 g/m$^2$ or less, preferably 25 g/m$^2$ or more and 35 g/m$^2$ or less. Similarly, the dust holding capacity of the second porous film 32 is, for example, 20 g/m$^2$ or more and 35 g/m$^2$ or less, preferably 20 g/m$^2$ or more and 30 g/m$^2$ or less.

In the filter medium 1 of the present embodiment, the pressure loss of the first porous film 31 and the pressure loss of the second porous film 32 may be the same or may be different from each other, but from the perspective of enhancing the dust holding capacity while maintaining the properties of having low pressure loss and high collection efficiency, it is preferable that the pressure loss of the first porous film 31 be smaller than the pressure loss of the second porous film 32.

Moreover, the collection efficiency of the first porous film 31 and the collection efficiency of the second porous film 32 may be the same or may be different from each other, but from the perspective of enhancing the dust holding capacity while maintaining the property of having low pressure loss and high collection efficiency, it is preferable that the collection efficiency of the second porous film 32 be higher than the collection efficiency of the first porous film 31.

As such, by having the pressure loss of the first porous film 31 be smaller than the pressure loss of the second porous film 32, and having the collection efficiency of the second porous film 32 be higher than the collection efficiency of the first porous film 31, it is possible to allow microparticles to pass through the first porous film 31 arranged on the upstream side to some extent, without being excessively collected, to the downstream side. Furthermore, sufficient collection can be performed at the second porous film 32 on the downstream side. Thereby, it is possible to perform collection across a broad area in the thickness direction of the filter medium 1, and to minimize the development of premature clogging on the upstream side layer.

Note that pressure loss means a pressure loss when air is passed through a porous film at a flow rate of 5.3 cm/s, and may also be referred simply to as pressure loss in the following descriptions.

It should be noted that, except for cases specifically indicated otherwise, collection efficiency means a collection efficiency for NaCl particles having a particle diameter of 0.3 μm when air containing the particles is passed through a porous film at a flow rate of 5.3 cm/s, and may also be referred simply to a collection efficiency in the following descriptions regarding features of the first porous film 31 or the second porous film 32.

The comparison between the pressure loss of the first porous film 31 and the pressure loss of the second porous film 32, for example, can be performed using the average value of the pressure losses measured at 10 to 50 locations of one porous film. The pressure loss at each measuring location is measured according to the manner described below. The magnitude of the difference between the pressure loss of the first porous film 31 and the pressure loss of the second porous film 32 is not particularly limited, and may be, for example, 10 Pa or more and 130 Pa or less. Moreover, though not particularly limited, the pressure loss of the first porous film 31 may be 30 Pa or more and 90 Pa or less, preferably 40 Pa or more and 80 Pa or less, and more preferably 50 Pa or more and 80 Pa or less. The pressure loss of the second porous film 32 may be 30 Pa or more and 90 Pa or less, preferably 40 Pa or more and 90 Pa or less, and more preferably 60 Pa or more and 80 Pa or less.

A comparison between the collection efficiency of the first porous film 31 and the collection efficiency of the second porous film 32 can be performed, for example, using the average value of the collection efficiencies measured at 10 to 50 locations of one porous film. The collection efficiency at each measuring location is measured using NaCl particles having a particle diameter of 0.3 μm according to the manner described below. Though not particularly limited, the collection efficiency of the first porous film 31 is, for example, 95% or more and 99.9% or less, and preferably 95% or more and 99% or less. The collection efficiency of the second porous film 32 is, for example, 95% or more and 99.9% or less, and preferably 99% or more and 99.9% or less.

As described above, the reason that the dust holding capacity can be enhanced by differentiating the first porous film 31 on the upstream side and the second porous film 32 on the downstream side is presumably because microparticles are allowed to flow to the downstream side since the average pore diameter of the first porous film is broader than that of the second porous film. In other words, it is considered that, by having the average pore diameter of the first porous film 31, which is the upstream side layer, be larger and rougher (specifically, the average pore diameter being 3.0 µm or more and 3.9 µm or less), microparticles were allowed to pass through the filter medium 1 in the depth (thickness) direction and collection was performed in a broader range in the thickness direction of the filter medium 1, and, as a result, the dust holding capacity was able to be improved. In particular, when using the first porous film 31 and the second porous film 32 prepared using the three types of components mentioned above, it is considered that, since there is sufficient thickness, an area in the thickness direction possible for collection could be ensured to enhance the dust holding capacity.

The first porous film 31 and the second porous film 32 are prepared, for example, according to a method for preparing a porous film included in the method for producing a filter medium for an air filter described hereafter.

(3) Air-Permeable Supporting Material

An upstream air-permeable supporting material 21 is arranged on the upstream side of the first porous film 31 and supports the first porous film 31. As such, even if it is difficult for the first porous film 31 to support itself due to having a small film thickness and the like, it is possible to have the first porous film 31 to stand with the support of the upstream air-permeable supporting material 21.

The downstream air-permeable supporting material 22 is arranged at the downstream side of the second porous film 32 and supports the second porous film 32. Note that the downstream air-permeable supporting material 22 is arranged so as to constitute the layer on the downmost stream side of the filter medium 1. Similarly, even if it is difficult for the second porous film 32 to support itself due to having a small film thickness and the like, it is possible to have the second porous film 32 to stand with the support of the downstream air-permeable supporting material 22.

There are no particular limitations to the material and structure of the upstream air-permeable supporting material 21 and the downstream air-permeable supporting material 22, but examples include nonwoven fabrics, woven fabrics, metal meshes, resin nets and the like. In particular, nonwoven fabrics having thermal fusing properties are preferable from the perspective of strength, collecting ability, flexibility, and operability. The nonwoven fabrics are preferably nonwoven fabrics having core/sheath structures in a portion or all of the constituting fibers, two-layer nonwoven fabrics constituted by two layers of a layer of fibers containing a low-melting point material and a layer of fibers containing a high-melting point material, or nonwoven fabrics coated with a thermal-fusing resin on the surface. Examples of such nonwoven fabrics include, for example, spun-bond nonwoven fabrics. Moreover, the nonwoven fabrics having core/sheath structures are preferably fabrics having a melting point of the core component that is higher than the melting point of the sheath component. Examples of the combinations of each material of the core/sheath structure include PET/PE and high-melting point polyester/low-melting point polyester. Examples of the combinations of low-melting point polyester/high-melting point polyester of the two-layer nonwoven fabrics include PE/PET, PP/PET, PBT/PET, and low-melting point PET/high-melting point PET. Examples of the nonwoven fabrics coated with a thermal-fusing resin on the surface include PET nonwoven fabrics coated with EVA (ethylene vinyl acetate copolymer resin) and PET nonwoven fabrics coated with an olefin resin.

There are no particular limitations to the material of the nonwoven fabrics, but polyolefin (PE, PP, etc.), polyamide, polyester (PET, etc.), aromatic polyamide, composite materials thereof and the like can be used.

The upstream air-permeable supporting material 21 can be joined to the first porous film 31 by melting a portion of the upstream air-permeable supporting material 21 by heating, or by melting a hot-melt resin, and by utilizing an anchor effect, or utilizing adhesion by a reactive adhesive and the like. Moreover, the downstream air-permeable supporting material 22 can be joined to the second porous film 32 in the same manner.

The upstream air-permeable supporting material 21 and the downstream air-permeable supporting material 22 may be of the same type or may be of a different type.

Each of the upstream air-permeable supporting material 21 and the downstream air-permeable supporting material 22, compared to the porous film mentioned above, may have extremely low pressure loss, collection efficiency and dust holding capacity, which can be regarded as substantially 0.

The pressure loss of each of the upstream air-permeable supporting material 21 and of the downstream air-permeable supporting material 22, for example, is preferably 10 Pa or less, more preferably 5 Pa or less, and even more preferably 1 Pa or less.

Moreover, the collection efficiency of each of the upstream air-permeable supporting material 21 and the downstream air-permeable supporting material 22 for NaCl particles having a particle diameter of 0.3 µm when air containing the NaCl particles is passed through a porous film at a flow rate of 5.3 cm/s, for example, may be substantially 0 or may be regarded as roughly 0.

Moreover, the thickness of each of the upstream air-permeable supporting material 21 and the downstream air-permeable supporting material 22, for example, is preferably 0.3 mm or less, and more preferably 0.25 mm or less.

Moreover, the weight per unit area of each of the upstream air-permeable supporting material 21 and the downstream air-permeable supporting material 22, for example, is preferably 20 g/m$^2$ or more and 50 g/m$^2$ or less.

(4) Pre-Collection Member

The pre-collection member 10 is arranged on the upstream side of the first porous film 31 (or on the upstream side of the upstream air-permeable supporting material 21 in the present embodiment), and is capable of collecting a portion of the dust in an air current.

From the perspective of reducing the pressure loss of the entire filter medium 1 to a low level, the pre-collection member 10 has a pressure loss of 5 Pa or more and less than 55 Pa, and preferably 15 Pa or more and less than 45 Pa, when air is passed through the pre-collection member 10 at a flow rate of 5.3 cm/s.

Moreover, the pre-collection member 10 has a collection efficiency for NaCl particles having a particle diameter of 0.3 µm of 15% or more and less than 85%, preferably 25% or more and less than 80%, and more preferably 30% or more and less than 75%, when air containing the NaCl particles is passed through the pre-collection member 10 at a flow rate of 5.3 cm/s. When the collection efficiency of the pre-collection member 10 is too low, the collecting loads on the first porous film 31 and the second porous film 32 become large, and premature clogging develops in the first porous film 31 and the second porous film 32. Moreover, when the collection efficiency of the pre-collection member 10 is too high, premature clogging develops in the pre-collection member 10 itself.

Further, the pre-collection member 10 has a thickness of more than 0.4 mm. As such, the pre-collection member 10 does not need to increase its density in order to achieve comparable collection efficiency, and is capable of catching relatively large collecting targets throughout the member in the thickness direction. Therefore it is possible not only to reduce the collecting loads on the first and the second porous films, but also to make premature clogging less likely to develop in the pre-collection member.

Moreover, unlike in the case of collecting targets being constituted only by solid particles, when the collecting targets include liquid particles in particular, the liquid particles are prone to reach the first and second porous films arranged downstream of the pre-collection member 10. As such, even when collecting targets include liquid particles, the pre-collection member has a thickness of more than 0.4 mm, which is a sufficiently large thickness, and therefore it is possible to retard the liquid particles to reach the first and the second porous films arranged on the downstream side. Also in this respect, it is possible to reduce the collecting loads on the first and the second porous films and to minimize clogging to develop in the first and the second porous films.

Note that the upper limit of the thickness of the pre-collection member 10 is not particularly limited, but from the perspective of facilitating the folding operation when pleating the filter medium 1, the upper limit is preferably 0.8 mm or less, and more preferably 0.7 mm or less. Further, regarding the thickness of the entire filter medium 1 including the pre-collection member 10, from the perspective of facilitating the folding operation when pleating the filter medium 1, the thickness should be 1.5 mm or less, preferably 1.3 mm or less, and more preferably 1.0 mm or less.

Moreover, the pre-collection member 10 preferably has a collection efficiency per unit of thickness (%/μm) for NaCl particles having a particle diameter of 0.3 μm when air containing the NaCl particles is passed through the pre-collection member 10 at a flow rate of 5.3 cm/s of 0.05%/μm or more and 0.29%/μm or less, and more preferably 0.07%/μm or more and 0.29%/μm or less, and from the perspective of improving both the dust holding capacity for polyalphaolefin particles and the dust holding capacity for NaCl particles, it is even more preferably 0.19%/μm or more and 0.25%/μm or less. By having the collection efficiency per unit of thickness of the pre-collection member be 0.05%/μm or more, it is possible to capture collecting targets so as to reduce the collecting loads on the first and the second porous films. Moreover, by having the collection efficiency per unit of thickness of the pre-collection member be 0.29%/μm or less, it is possible to make premature clogging in the pre-collection member less likely to develop.

Here, collection efficiency per unit of thickness (%/μm) of the pre-collection member for NaCl particles having a particle diameter of 0.3 μm when air containing the NaCl particles is passed through the pre-collection member at a flow rate of 5.3 cm/s being 0.05% or more and 0.29% or less is not limited to a collection efficiency per unit of thickness for NaCl particles having a particle diameter of 0.3 μm that is uniform at an optional location in the thickness direction of the pre-collection member. For example, it is not limited to the case where a collection efficiency per unit of thickness of the pre-collection member for NaCl particles having a particle diameter of 0.3 μm at an optional location in the thickness direction is 0.05% or more and 0.29% or less, and the value of the collection efficiency of the pre-collection member is uniform throughout the member in the thickness direction. In other words, collection efficiency per unit of thickness for NaCl particles having a particle diameter of 0.3 μm may not be uniform in the thickness direction of the pre-collection member. The collection efficiency per unit of thickness for NaCl particles having a particle diameter of 0.3 μm in the thickness direction of the pre-collection member may take on a high value at one location and a low value at another location, and the collection efficiency per unit of thickness for NaCl particles having a particle diameter of 0.3 μm is preferably 0.05% or more at a location with a low value, and the collection efficiency per unit of thickness for NaCl particles having a particle diameter of 0.3 μm is preferably 0.29% or less at a location with a high value.

Note that collection efficiency per unit of thickness e (%/μm) of the pre-collection member for NaCl particles having a particle diameter of 0.3 μm when air containing the NaCl particles is passed through the pre-collection member at a flow rate of 5.3 cm/s can be obtained from the following formulae. Here, E is a collection efficiency for NaCl particles having a particle diameter of 0.3 μm, t is a permeability per unit of thickness of NaCl particles having a particle diameter of 0.3 μm of the pre-collection member, and n is a thickness (μm) of the pre-collection member. Specifically, by using the relationship between a value obtained by raising the permeability per unit of thickness of the pre-collection member (t) to the power of the thickness of the pre-collection member (n) (which is equal to the permeability of the entire pre-collection member), and the value of the collection efficiency of the entire pre-collection member in formula 1, the permeability per unit of thickness of the pre-collection member (t) is calculated. Further, by using the relationship between the collection efficiency per unit of thickness of the pre-collection member (e), and the permeability per unit of thickness of the pre-collection member (t) in formula 2, the collection efficiency e (%/μm) per unit of thickness of the pre-collection member for NaCl particles having a particle diameter of 0.3 μm is calculated when air containing the NaCl particles is passed through the pre-collection member at a flow rate of 5.3 cm/s.

$$E = 1 - t^n \quad \text{Formula 1:}$$

$$e = (1 - t) \times 100 \quad \text{Formula 2:}$$

The weight per unit area of the pre-collection member 10 is not particularly limited, but, for example, it may be 50 g/m² or more and 70 g/m² or less, and preferably 55 g/m² or more and 67 g/m² or less.

Such pre-collection member 10 is not particularly limited, but it may be constituted by a glass fiber-filter medium, or it may be a nonwoven fabric or a fiber layer structure constituted by a fiber material produced by any of a melt-blown method, an electro-spinning method, a sea-island method, and a hybrid method thereof. The hybrid method includes, for example, a melt spinning method or an electret-blown method. The sea-island method, for example, is a method where fibers are formed by discharging raw materials from more than one discharge port. Different raw materials are discharged through different discharge routes, and a sea portion is constituted by some raw materials, and an island portion is constituted by other different raw materials, so that a cross section has a sea-island structure. Here, a polymer is spun from two sea-island components or more than one component, and by melting the sea-components in a later process, it is possible to have a fiber with the island portion remaining. Further, by combining raw materials from different discharge routes, it is possible to adjust the bulk density, the stretchability and the like. In the melt-blown method, while discharging melted polymer from a nozzle of an extrusion device, threads are formed by blowing heated air along the nozzle. Here, threads with smaller diameters can be obtained by adjusting the amount of discharge of polymer per unit of time from the nozzle, blowing rate of heated air and the like. Moreover, the physical properties of the threads can be modified by the melt viscosity of the polymer used. Examples of materials used when the pre-collection member 10 is produced by any of a melt-blown method, an electro-spinning method, a sea-island method, and a hybrid method thereof include polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), polyurethane (PU), and combinations thereof and the like.

Since the pre-collection member 10 is used along with the first porous film 31 and the second porous film 32, a spark caused by static electricity may make a hole in the first porous film 31 or in the second porous film 32. To reduce such adverse event, it is preferable that the pre-collection member 10 be constituted with a glass fiber-filter medium which is a material unlikely to be electrically charged. Note that the glass fiber-filter medium having properties mentioned above may be produced, or it may be commercially acquired.

Further, when not a glass fiber-filter medium that is unlikely to be electrically charged, but a melt-blown non-woven fabric or the like that is prone to be electrically charged is used as the pre-collection member, the pre-collection member may accidentally be electrically charged and the collection efficiency of the pre-collection member may increase, thereby premature clogging in the pre-collection member itself may develop and the dust holding capacity of the entire filter medium for an air filter may not be enhanced. From the perspective of avoiding the problem, a glass fiber-filter medium which is a material unlikely to be electrically charged is preferably used.

(5) Entire Filter Medium

The pressure loss of filter medium 1 is preferably less than 200 Pa, and more preferably 70 Pa or more and 195 Pa or less. By keeping the pressure loss of the filter medium 1 within such range, the pressure loss can be decreased at a low level compared to the pressure loss of a HEPA filter composed only of a glass filter media.

Moreover, the collection efficiency of the filter medium 1 is preferably 99.97% or more. A filter medium meeting such collection efficiency can be used as a filter for a HEPA grade.

Moreover, the filter medium 1 preferably has a dust holding capacity of 50 g/m$^2$ or more for polyalphaolefin particles having a count median particle diameter of 0.25 μm when air containing the polyalphaolefin particles is continuously passed through the filter medium 1 at a flow rate of 5.3 cm/s and the pressure loss is increased by 250 Pa. In this case, it is possible to ensure a large dust holding capacity, since this is a case of a collecting target being polyalphaolefin particles which are liquid particles having relatively a large particle diameter.

Further, the filter medium 1 preferably has a dust holding capacity of 5.0 g/m$^2$ or more for NaCl particles having a count median particle diameter of 0.1 μm when air containing the NaCl particles is continuously passed through the filter medium 1 at a flow rate of 5.3 cm/s and the pressure loss is increased by 250 Pa. In this case, it is possible to ensure a large dust holding capacity, since this is a case of a collecting target being NaCl particles which are solid particles having relatively a small particle diameter.

Further, the filter medium 1 more preferably has a dust holding capacity of 50 g/m$^2$ or more for polyalphaolefin particles having a count median particle diameter of 0.25 μm when air containing the polyalphaolefin particles is continuously passed through the filter medium 1 at a flow rate of 5.3 cm/s and the pressure loss is increased by 250 Pa, and more preferably has a dust holding capacity of 5.0 g/m$^2$ or more for NaCl particles having a count median particle diameter of 0.1 μm when air containing the NaCl particles is continuously passed through the filter medium 1 at a flow rate of 5.3 cm/s and the pressure loss is increased by 250 Pa. In this case, it is possible to ensure a large dust holding capacity, since this is a case of collecting targets being a mixture of polyalphaolefin particles which are liquid particles having relatively a large particle diameter, and NaCl particles which are solid particles having relatively a small particle diameter.

In the filter medium 1 of this embodiment, in the case of using porous films having features of a pressure loss of 30 Pa or more and 90 Pa or less when air is passed through the porous film at a flow rate of 5.3 cm/s, and a collection efficiency of 95% or more and 99.9% or less for NaCl particles having a particle diameter of 0.3 μm when air containing the NaCl particles is passed through the porous film at a flow rate of 5.3 cm/s as the first porous film 31 and the second porous film 32, by using the pre-collection member 10 arranged on the upstream side of these porous films having features of a pressure loss of 5 Pa or more and less than 55 Pa when air is passed through the pre-collection member at a flow rate of 5.3 cm/s, a collection efficiency of 15% or more and less than 85% for NaCl particles having a particle diameter of 0.3 μm when air containing the NaCl particles is passed through the pre-collection member at a flow rate of 5.3 cm/s, and a thickness of more than 0.4 mm, in the entire filter medium 1, the pre-collection member 10 is capable of collecting dust to the extent that premature clogging does not develop in the pre-collection member 10, collecting loads on the first porous film 31 and the second porous film 32 in the downstream side can be adequately reduced, and premature clogging in the first porous film 31 and the second porous film 32 can be decreased. Thereby, it is possible to collect more dust in a broad range in the thickness direction, for example, it is possible that the filter medium 1 has a dust holding capacity of 50 g/m$^2$ or more for polyalphaolefin particles having a count median particle diameter of 0.25 μm when air containing the polyalphaolefin particles is continuously passed through the filter medium 1 at a flow rate of 5.3 cm/s and the pressure loss is increased by 250 Pa, and has a dust holding capacity of 5.0 g/m$^2$ or more for NaCl particles having a count median particle diameter of 0.1 μm when air containing the NaCl particles is continuously passed through the filter medium 1 at a flow rate of 5.3 cm/s and the pressure loss is increased by 250 Pa.

(6) Modifications (6-1)

Modifications of the filter medium for an air filter 1 of the present embodiment are hereinafter described with reference to FIG. 2.

In the filter medium for an air filter 1 mentioned above, an example of a filter medium having a 5-layer structure was described, where the filter medium is equipped with the pre-collection member 10, the optional upstream air-permeable supporting material 21, the first porous film 31, the second porous film 32, and the optional downstream air-permeable supporting material 22 arranged sequentially from the upstream side of the air current.

Figure 2:
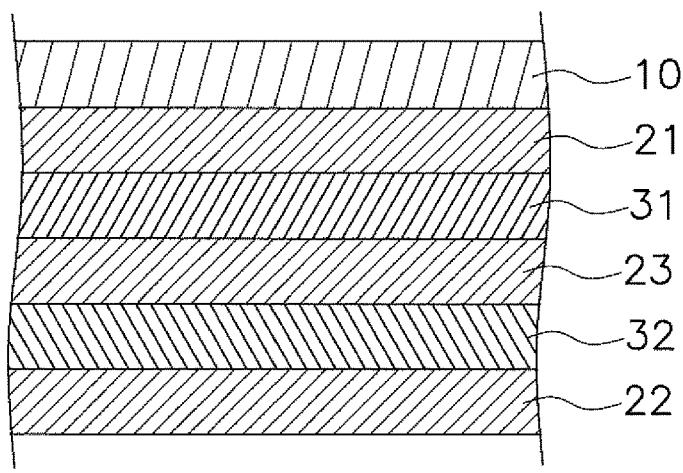
FIG. 2 is a schematic cross sectional view showing a layer constitution of a filter medium having a 6-layer structure according to a modification.

On the other hand, for example, the filter medium may be a filter medium for an air filter 2 having a 6-layer structure as shown in FIG. 2.

Similarly to the filter medium for an air filter 1, the filter medium for an air filter 2 includes the pre-collection member 10, the optional upstream air-permeable supporting material 21, the first porous film 31, the second porous film 32, and the optional downstream air-permeable supporting material 22 arranged sequentially from the upstream side of an air current, and the filter medium for an air filter 2 further includes an optional middle-stream air-permeable supporting material 23 between the first porous film 31 and the second porous film 32.

In this filter medium for an air filter 2, the pre-collection member 10, the upstream air-permeable supporting material 21, the first porous film 31, the second porous film 32, and the downstream air-permeable supporting material 22 are all the same as those of the filter medium for an air filter 1 mentioned above.

As for the middle-stream air-permeable supporting material 23, it is possible to use the material described in the section of the air-permeable supporting material similarly to the upstream air-permeable supporting material 21 and the downstream air-permeable supporting material 22 mentioned above. The upstream air-permeable supporting material 21, the downstream air-permeable supporting material 22, and the middle-stream air-permeable supporting material 23 may be of the same type or may be of different types.

Even with the constitution of the filter medium for an air filter 2, similarly to the filter medium for an air filter 1 mentioned above, it is possible to enhance the dust holding capacity for polyalphaolefin particles and/or the dust holding capacity for NaCl particles mentioned above while maintaining the physical properties of the pressure loss of less than 200 Pa and the collection efficiency of 99.97% or more.

Note that the filter medium for an air filter 1 and filter medium for an air filter 2 were described with examples having two porous films, but the number of porous films may be three or more. In such cases, it is preferable that the more than one porous film be arranged such that the magnitude of the pressure loss of each porous film decreases in order from the downstream side to the upstream side of the air current.
(6-2)

In the filter medium for an air filter 1 mentioned above, an example of a filter medium with a 5-layer structure was described, where the filter medium is equipped with the pre-collection member 10, the optional upstream air-permeable supporting material 21, the first porous film 31, the second porous film 32, and the optional downstream air-permeable supporting material 22 arranged sequentially from the upstream side of the air current.

Figure 3:
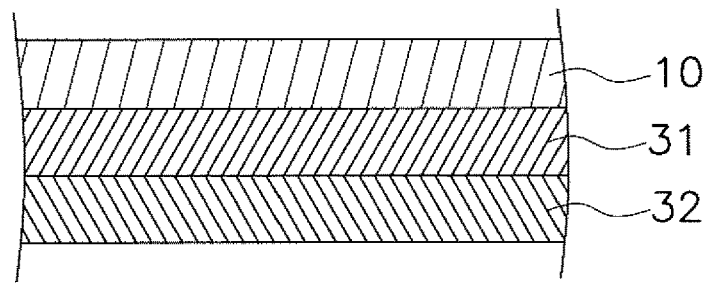
FIG. 3 is a schematic cross sectional view showing a layer constitution of a filter medium having a 3-layer structure according to a modification.

On the other hand, the filter medium, for example, may be a filter medium for an air filter 3 having a 3-layer structure as shown in FIG. 3.

The filter medium for an air filter 3, similarly to the filter medium for an air filter 1, is equipped with the pre-collection member 10, the first porous film 31, and the second porous film 32 arranged sequentially from the upstream side of the air current.

In the filter medium for an air filter 3, the pre-collection member 10, the first porous film 31, and the second porous film 32 are all the same as those of the filter medium for an air filter 1 mentioned above.

Compared to the filter medium for an air filter 1 mentioned above, the filter medium for an air filter 3, is not equipped with the optional upstream air-permeable supporting material 21 or the optional downstream air-permeable supporting material 22, and therefore has a structure that is less strong and less self-supportive. However, strength is not always desired depending on the structure of the location used or the installation environment, and therefore it may be used as a filter medium for an air filter.

Even with the constitution of the filter medium for an air filter 3, similarly to the filter medium for an air filter 1 mentioned above, it is possible to enhance the dust holding capacity for polyalphaolefin particles and/or the dust holding capacity for NaCl particles mentioned above while maintaining the physical properties of the pressure loss of less than 200 Pa and the collection efficiency of 99.97% or more.

Further, in the filter medium for an air filter 3 as well, the number of porous films used is not limited to two, but may be three or more. In such case, it is preferable that the more than one porous film be arranged such that the magnitude of the pressure loss of each porous film decreases in order from the downstream side to the upstream side of the air current.
(6-3)

In the filter medium for an air filter 1 mentioned above, an example of a filter medium with a 5-layer structure was described, where the filter medium is equipped with the pre-collection member 10, the optional upstream air-permeable supporting material 21, the first porous film 31, the second porous film 32, and the optional downstream air-permeable supporting material 22 arranged sequentially from the upstream side of the air current.

Figure 4:
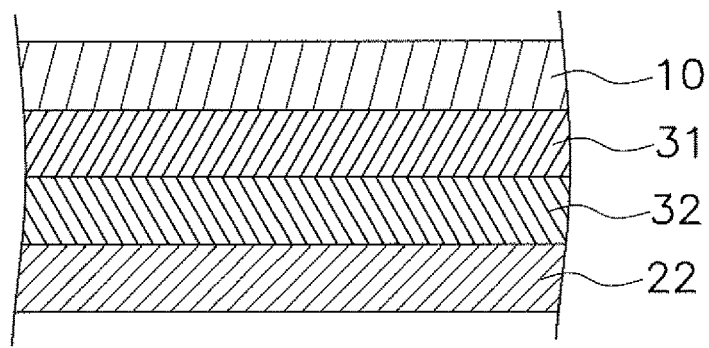
FIG. 4 is a schematic cross sectional view showing a layer constitution of a filter medium having a 4-layer structure according to a modification.

On the other hand, the filter medium, for example, may be a filter medium for an air filter 4 having a 4-layer structure as shown in FIG. 4.

The filter medium for an air filter 4, similarly to the filter medium for an air filter 1, is equipped with the pre-collection member 10, the first porous film 31, the second porous film 32, and the optional downstream air-permeable supporting material 22 arranged sequentially from the upstream side of the air current.

In the filter medium for an air filter 4, the pre-collection member 10, the first porous film 31, the second porous film 32, and the optional downstream air-permeable supporting material 22 are all the same as those of the filter medium for an air filter 1 mentioned above.

Compared to the filter medium for an air filter 1 mentioned above, the filter medium for an air filter 4, is not equipped with the optional upstream air-permeable supporting material 21, and therefore has a structure that is less strong, but it can be self-supportive. Even with the constitution of the filter medium for an air filter 4, similarly to the filter medium for an air filter 1 mentioned above, it is possible to enhance the dust holding capacity for polyalphaolefin particles and/or the dust holding capacity for NaCl particles mentioned above while maintaining the physical properties of the pressure loss of less than 200 Pa and the collection efficiency of 99.97% or more.

Further, in the filter medium for an air filter 4 as well, the number of porous films used is not limited to two, but may be three or more. In such case, it is preferable that the more than one porous film be arranged such that the magnitude of the pressure loss of each porous film decreases in order from the downstream side to the upstream side of the air current.
(6-4)

In the filter medium for an air filter 2 mentioned above, an example of a filter medium having a 6-layer structure was described, where the filter medium is equipped with the pre-collection member 10, the optional upstream air-permeable supporting material 21, the first porous film 31, the optional middle-stream air-permeable supporting material 23, the second porous film 32, and the optional downstream air-permeable supporting material 22 arranged sequentially from the upstream side of the air current.

Figure 5:
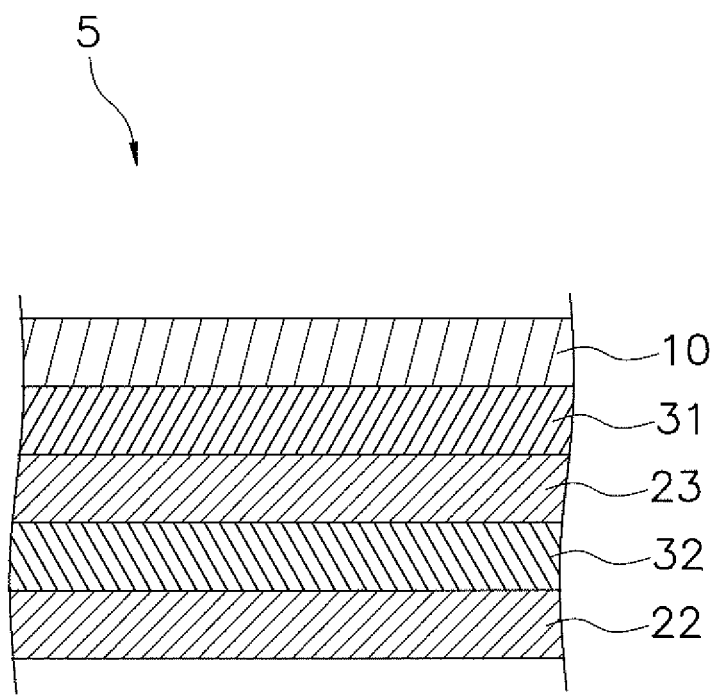
FIG. 5 is a schematic cross sectional view showing a layer constitution of a filter medium having a 5-layer structure according to a modification.

On the other hand, the filter medium, for example, may be a filter medium for an air filter 5 having a 5-layer structure as shown in FIG. 5.

Similarly to the filter medium for an air filter 2, the filter medium for an air filter 5 is equipped with the pre-collection member 10, the first porous film 31, the optional middle-stream air-permeable supporting material 23, the second porous film 32, and the optional downstream air-permeable supporting material 22 arranged sequentially from the upstream side of the air current, but the optional upstream air-permeable supporting material 21 is not equipped.

In this filter medium for an air filter 5, the pre-collection member 10, the first porous film 31, the optional middle-stream air-permeable supporting material 23, the second porous film 32, and the optional downstream air-permeable supporting material 22 are all the same as those of the filter medium for an air filter 2 mentioned above.

Compared to the filter medium for an air filter 2 mentioned above, the filter medium for an air filter 5, in not equipped with the optional upstream air-permeable supporting material 21, and therefore has a structure that is less strong, but it can be self-supportive.

Even with the constitution of the filter medium for an air filter 5, similarly to the filter medium for an air filter 1 mentioned above, it is possible to enhance the dust holding capacity for polyalphaolefin particles and/or the dust holding capacity for NaCl particles mentioned above while maintaining the physical properties of the pressure loss of less than 200 Pa and the collection efficiency of 99.97% or more.

Note that in the filter medium for an air filter 5 as well, the number of porous films used is not limited to two, but may be three or more. In such case, it is preferable that the more than one porous film be arranged such that the magnitude of the pressure loss of each porous film decreases in order from the downstream side to the upstream side of the air current.

(7) Examples of Use

The filter medium for an air filter may be used, for example, in the following uses.

Fields in: ULPA filters (Ultra low Penetration Air Filter) (for manufacturing semiconductors), HEPA filters (for hospitals, and for manufacturing semiconductors), cylindrical cartridge filters (for industrial use), bag filters (for industrial use), heat-resistant bag filters (for exhaust gas treatment), heat-resistant pleated filters (for exhaust gas treatment), SINBRAN (a registered trademark) filters (for industrial use), catalytic filters (for exhaust gas treatment), filters containing adsorbents (for assembly in hard disk drives (HDD)), vent filters containing adsorbents (for assembly in HDDs), vent filters (for assembly in HDDs, etc.), vacuum cleaner filters (for vacuum cleaners), general purpose multilayer felt materials, gas turbine cartridge filters (gas turbine compatible parts), cooling filters (for use in electronic device housings), etc.;

ventilation/internal pressure regulation fields, such as materials for freeze drying use of containers for freeze drying use, automotive ventilation materials for electronic circuits and lamps, container uses such as container caps, protective ventilation uses for electronic equipment, and medical ventilation applications; and liquid filtration fields such as semiconductor liquid filtration filters (for manufacturing semiconductors), hydrophilic filters (for manufacturing semiconductors), filters for chemical products (chemical solution treatment), filters for purified water manufacturing lines (for manufacturing purified water), backwashing liquid filtration filters (for industrial effluent treatment), etc.

(8) Filter Pack

The filter pack of the present embodiment is hereinafter described with reference to FIG. 6.

Figure 6:
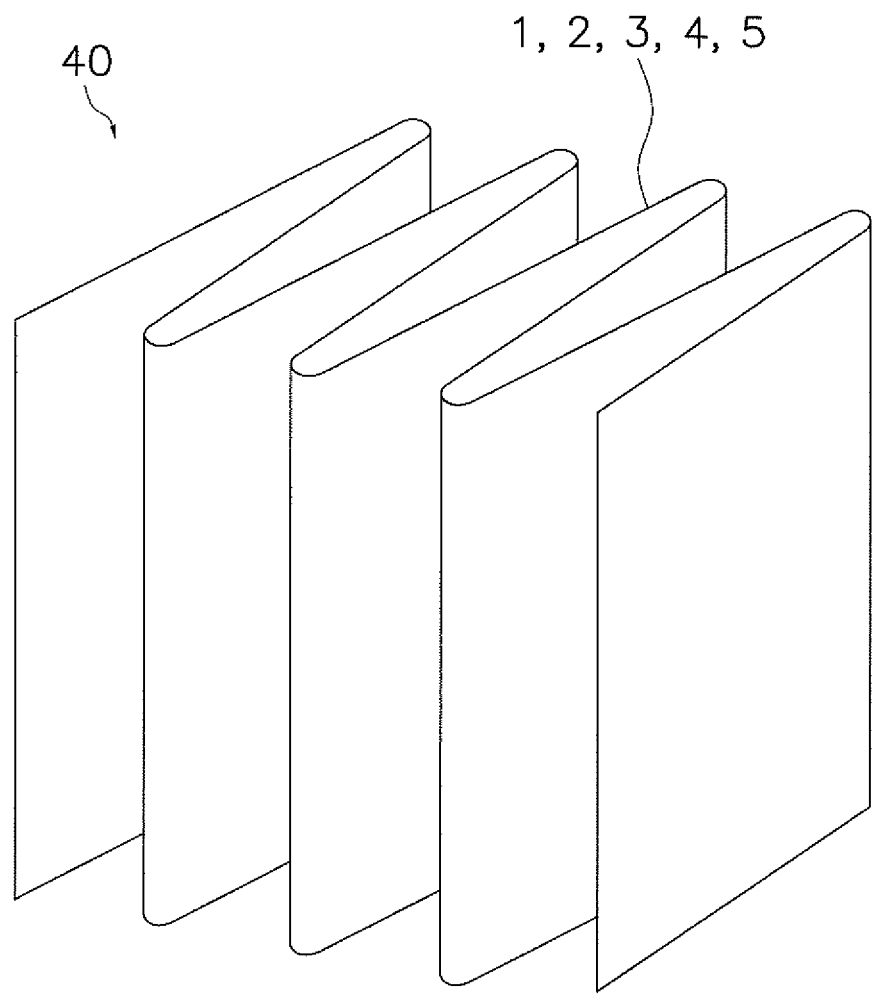
FIG. 6 is an external perspective view of a filter pack of the present embodiment.

FIG. 6 is an external perspective view of a filter pack 40 of the present embodiment.

The filter pack 40 is equipped with the filter medium for an air filter described above (for example, the filter medium for an air filter 1 or the filter medium for an air filter 2). The filter medium for an air filter of the filter pack 40 is a processed filter medium processed into a zigzag configuration produced by alternately repeating mountain folds and valley folds (pleating process). The pleating process can be carried out, for example, by a rotary folding machine. A fold width of a filter medium is not particularly limited, but, for example, may be 25 mm or more and 280 mm or less. By performing the pleating process, the filter pack 40 may have a larger folding area of the filter media when used for an air filter unit, thereby making it possible to obtain an air filter unit with high collection efficiency.

The filter pack 40, in addition to the filter medium, may further be equipped with a spacer (not shown) for keeping the pleating space when used for the air filter unit. The material of the spacer is not specifically limited, but a hot-melt resin may preferably be used.

(9) Air Filter Unit

Next, an air filter unit 60 will be described with reference to FIG. 7.

Figure 7:
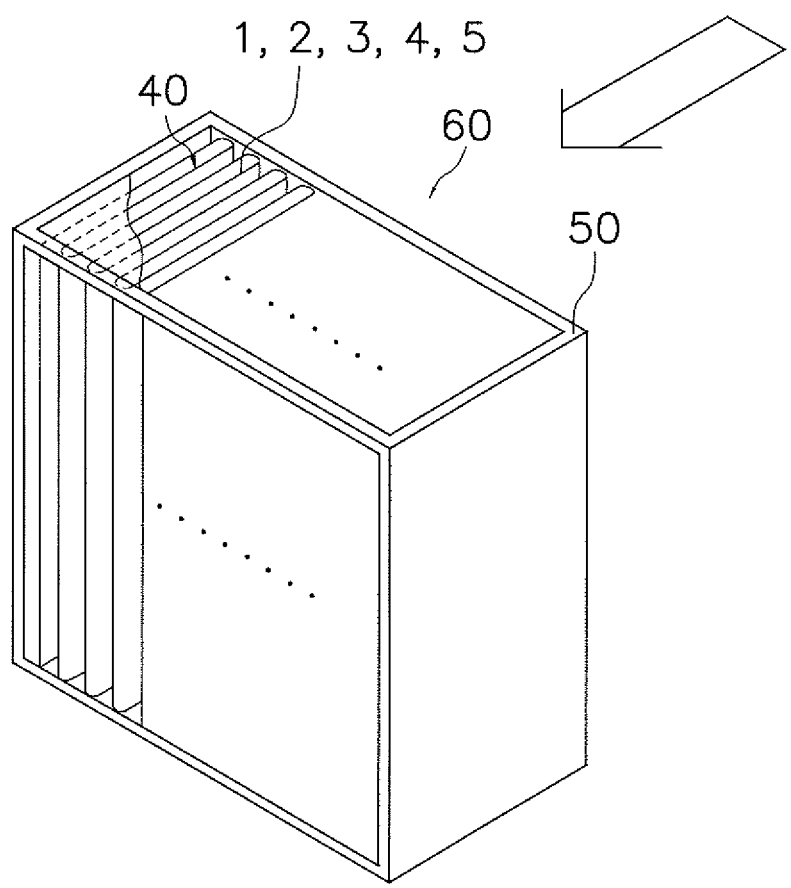
FIG. 7 is an external perspective view of an air filter unit of the present embodiment.

FIG. 7 is an external perspective view of an air filter unit 60 of the present embodiment.

The air filter unit 60 is equipped with the filter medium for an air filter or the filter pack mentioned above, and a frame 50 to hold the filter medium for an air filter or the filter pack. In other words, the air filter unit may be produced such that the filter medium is held in the frame, or may be produced such that the filter pack 40 is held in the frame 50. The air filter unit 60 shown in FIG. 7 is produced using the filter pack 40 and the frame 50.

The frame 50 is made, for example, by combining boards or by molding a resin, and space between the filter pack 40 and the frame 50 is preferably sealed with a sealant. The sealant is for preventing leak between the filter pack 40 and the frame 50, and those made of a resin, for example, epoxy, acrylic, urethane or others may be used.

The air filter unit 60 equipped with the filter pack 40 and the frame 50 may be a minipleats type air filter unit held so that one filter pack 40 extending in a flat plane form is stored inside the frame 50, or may also be a V-bank type air filter unit or a single header type air filter unit holding aligned more than one filter pack extending in flat plane form in the frame.

On the other hand, the air filter unit equipped with the filter medium and the frame may also be a separator type air filter unit where the filter medium is in an alternately folded wave shape, and where a separator that has undergone corrugation processing, for example, is arranged in each of the valley parts of the filter medium formed by alternately folding.

(10) Method for Producing a Filter Medium for an Air Filter

Next, a method for producing the filter medium for an air filter of the present embodiment is hereinafter described.

A method for producing a filter medium of the present embodiment is a method for producing a filter medium for an air filter for collecting dust in air includes:

(a) a step of obtaining a first porous film and a second porous film primarily containing a fluororesin;
(b) a step of arranging the first porous film on the side that is upstream of an air current of the second porous film; and
(c) a step of arranging a pre-collection member on the side that is upstream of the air current of the first porous film so as to collect a portion of the dust in the air current.

Each of the first porous film and the second porous film has a pressure loss of 30 Pa or more and 90 Pa or less when air is passed through each porous film at a flow rate of 5.3 cm/s, and has a collection efficiency for NaCl particles having a particle diameter of 0.3 μm of 95% or more and 99.9% or less when air containing the NaCl particles is passed through each of the porous films at a flow rate of 5.3 cm/s.

The pre-collection member has the pressure loss of 5 Pa or more and less than 55 Pa, the collection efficiency of 15% or more and less than 85%, and a thickness of more than 0.4 mm.

The method further includes a step of integrating the first porous film, the second porous film, and the pre-collection member by heat lamination.

As for the fluororesin used in step (a), a similar resin to one used for the filter medium for an air filter described above is used. Further, the first porous film and the second porous film may further contain other components that are different from the fluororesin.

Moreover, it is also possible to further provide a step (d) of arranging an upstream air-permeable supporting material that supports the first porous film on the side that is upstream of the air current of the first porous film. It is also possible to further provide a step of integrating the first porous film, the second porous film, the upstream air-permeable supporting material, and the pre-collection member by heat lamination.

Moreover, it is also possible to further provide a step (e) of arranging a downstream air-permeable supporting material that supports the second porous film on the side that is downstream of the air current of the second porous film. It is also possible to further provide a step of integrating the first porous film, the second porous film, the downstream air-permeable supporting material, and the pre-collection member by heat lamination.

In addition, it is also possible to further provide the steps (d) and (e) mentioned above, and to further provide a step of integrating the first porous film, the second porous film, the upstream air-permeable supporting material, the downstream air-permeable supporting material, and the pre-collection member by heat lamination.

Here, a method for producing the first porous film and the second porous film using the three types of components mentioned above in step (a), is described using an example.

The form of each of the three components A to C described above is not particularly limited, and may be, for example, a composition, powder mixture, or molding material to be described later. First, the composition, powder mixture, and molding material which are raw materials for the porous films are described.

Each of the composition, powder mixture, and molding material include the component A, component B, and component C mentioned above, and contains the component C in an amount of 0.1 wt. % or more and 20 wt. % or less of the entire material. The component A, component B, and component C are respectively the same as the fiberizable PTFE, non-fiberizable non-heat melt processable component, and non-fiberizable heat melt processable component mentioned above in relation to the porous films.

The molding material is, for example, a material for molding a porous film, intended for molding a porous film used in a filter medium for collecting microparticles in a gas.

The form of the raw material for the porous film may be a powder mixture as will be described later, may be a non-powder mixture, or may be a molding material or composition as will be described later. Examples of the powder mixture include a fine powder obtained by co-coagulation as employed in the examples as will be described later, a powder obtained by mixing of two of the three raw materials by co-coagulation followed by mixing the resulting mixture with the remaining one component with a mixer, and a powder obtained by mixing the three raw materials with a mixer. Examples of the non-powder mixture include a molding such as a porous body (e.g., a porous film), and an aqueous dispersion that includes the three components.

A molding material refers to a material that underwent adjustment for processing in order to mold a composition, and examples thereof include a material with a processing aid (a liquid lubricant, etc.), etc. added, a material whose particle size is adjusted, and a material that underwent preliminary molding. The molding material may contain, for example, a publicly known additive, etc., in addition to the three components mentioned above. Examples of the publicly known additive include carbon nanotubes, carbon black, and other such carbon materials, pigments, photocatalysts, activated carbon, antimicrobial agents, adsorbents, deodorizers and the like.

The composition can be prepared by various methods; for example, in the case where the composition is a powder mixture, it may be produced by a method of mixing a powder of the component A, a powder of the component B, and a powder of the component C, with an ordinary mixer, etc., a method of obtaining a co-coagulated powder by co-coagulating three aqueous dispersions each containing the component A, component B, and component C (the step (a) mentioned above), a method of co-coagulating in advance an aqueous dispersion containing any two of the component A, component B, and component C to obtain a powder mixture followed by mixing the powder mixture with a powder of the remaining one component with an ordinary mixer, etc. Any method for production among methods mentioned above can be employed to obtain a preferable stretched material. In particular, the composition is preferably one that can be obtained by co-coagulating three aqueous dispersions each containing the component A, component B, and component C, where in the method, the three different components can be homogeneously dispersed with ease.

The size of the powder mixture obtained by co-coagulation is not particularly limited, but, for example, the average particle diameter is, 100 μm or more and 1,000 μm or less, and preferably 300 μm or more and 800 μm or less. In this case, the average particle diameter is measured in accordance with JIS K6891. The apparent density of the powder mixture obtained by co-coagulation is not particularly limited, but, for example, it is 0.40 g/ml or more and 0.60 g/ml or less, and preferably 0.45 ml or more and 0.55 g/ml or less. The apparent density is measured in accordance with JIS K6892.

Examples of the co-coagulation method mentioned above include:
(i) a method of mixing an aqueous dispersion of component A, an aqueous dispersion of component B, and an aqueous dispersion of component C, followed by coagulation;

(ii) a method of adding, to an aqueous dispersion of any one component from among component A, component B, and component C, powders of the remaining two components, followed by coagulation;

(iii) a method of adding a powder of any one component from among component A, component B, and component C, to a mixed aqueous dispersion obtained by mixing aqueous dispersions of the remaining two components, followed by coagulation; and (iv) a method of mixing aqueous dispersions of any two components from among component A, component B, and component C in advance, followed by coagulation to obtain a powder mixture of the two components, which is added to an aqueous dispersion of the remaining one component, followed by coagulation.

As a method for co-coagulation mentioned above, in terms of the ease for each of the three components to homogeneously disperse, the method described in (i) is preferable.

In the co-coagulation by the methods of (i) to (iv) mentioned above, it is preferable to perform coagulation by adding, for example, any one of nitric acid, hydrochloric acid, sulfuric acid, or other acids; magnesium chloride, calcium chloride, sodium chloride, aluminum sulfate, magnesium sulfate, barium sulfate, sodium bicarbonate, sodium carbonate, or other metal salts; or acetone, methanol, or other organic solvents.

The form of the component A prior to mixing is not particularly limited, and it may be an aqueous dispersion of the fiberizable PTFE mentioned above, or it may be a powder. Examples of the powder (in particular, the fine powder mentioned above) include: TEFLON 6-J, TEFLON 6C-J, TEFLON 62-J, etc. manufactured by Mitsui-DuPont Fluorochemicals Co., Ltd. (with a registered trademark of TEFLON); POLYFLON F106, POLYFLON F104, POLYFLON F201, POLYFLON F302, etc. manufactured by Daikin Industries, LTD. (with a registered trademark of POLYFLON); FLUON CD123, FLUON CD1, FLUON CD141, FLUON CD145, etc. manufactured by Asahi Glass Co., Ltd. (with a registered trademark of FLUON); and TEFLON 60, TEFLON 60 X. TEFLON 601A, TEFLON 601 X, TEFLON 613A, TEFLON 613A X, TEFLON 605XT X, TEFLON 669 X, etc. manufactured by Du pont. The fine powder may be obtained by coagulation and drying of an aqueous dispersion (freshly-polymerized aqueous dispersion) of the fiberizable PTFE obtained from emulsion polymerization of TFE.

The aqueous dispersion of the fiberizable PTFE may be a freshly-polymerized aqueous dispersion mentioned above, or may be a commercially available aqueous dispersion. Examples of a preferable method for producing a freshly-polymerized fiberizable PTFE aqueous dispersion include production methods disclosed in the publications and others mentioned above listed as disclosing homo-PTFE. Examples of commercially available aqueous dispersions of fiberizable PTFE include aqueous dispersions such as POLYFLON D-110, POLYFLON D-210, POLYFLON D-210C, POLYFLON D-310, etc. manufactured by Daikin Industries; TEFLON 31-JR, TEFLON 34-JR, etc. manufactured by Mitsui-Dupont Fluorochemicals; and FLUON AD911L, FLUON AD912L, AD938L, etc. manufactured by Asahi Glass. Any of the commercially available aqueous dispersion of fiberizable PTFE contains 2 to 10 weight parts of nonionic surfactants, etc. per 100 weight parts of PTFE in the aqueous dispersion in order to maintain stability, and therefore the nonionic surfactants are likely to remain in the powder mixture obtained by co-coagulation, which may pose problems such as coloration of porous bodies. As such, a freshly-polymerized aqueous dispersion is preferable as the aqueous dispersion of fiberizable PTFE.

The form of the component B prior to mixing is not particularly limited, but when component B is a low-molecular weight PTFE, the form prior to mixing is not particularly limited, but it may be an aqueous dispersion, or it may be a powder (generally called a PTFE micropowder or micropowder). Examples of the powders of low-molecular weight PTFE include: MP1300-J, etc. manufactured by Mitsui-Dupont Fluorochemicals; LUBRON L-5, LUBRON L-5F, etc. manufactured by Daikin Industries (with a registered trademark of LUBRON); FLUON L169J, FLUON L170J, FLUON L172J, etc. manufactured by Asahi Glass; and KTL-F, KTL-500F, etc. manufactured by KITAMURA LIMITED.

The aqueous dispersion of low-molecular weight PTFE may be a freshly-polymerized aqueous dispersion obtained from emulsion polymerization of TFE mentioned above, or may be a commercially available aqueous dispersion. Moreover, a micropowder dispersed in water using a surfactant, etc. can also be used. Examples of a preferred method for producing a freshly-polymerized fiberizable PTFE aqueous dispersion include production methods disclosed in Japanese Laid-open Patent Publication No. H07-165828, Japanese Laid-open Patent Publication No. H10-147617, Japanese Laid-open Patent Publication No. 2006-063140, Japanese Laid-open Patent Publication No. 2009-1745, WO2009/020187, and the like. Examples of a commercially available aqueous dispersion of fiberizable PTFE include aqueous dispersions such as LUBRON LDW-410, etc. manufactured by Daikin Industries. Any of the commercially available aqueous dispersion of low-molecular weight PTFE contains 2 to 10 weight parts of nonionic surfactants, etc. per 100 weight parts of PTFE in the aqueous dispersion in order to maintain stability, and therefore the nonionic surfactants are likely to remain in the powder mixture obtained by co-coagulation, which may pose problems such as discoloration of porous bodies. As such, a freshly-polymerized aqueous dispersion is preferable as the aqueous dispersion of low-molecular weight PTFE.

Moreover, when using an inorganic filler as the component B, the form thereof prior to mixing is not particularly limited, but, an aqueous dispersion is preferred. Examples of the inorganic filler include TALC P2 manufactured by Nippon Talc, LMR-100 manufactured by Fuji Talc Industrial Co. and the like. The fillers may appropriately undergo surface treatment with a silane coupling agent, etc., and the powder is dispersed in water for use. In particular, for reason of dispersibility in water, a secondary-milled product (TALC P2, etc.) produced by a jet mill is preferably used.

Examples of the component C include, besides fluororesins such as FEP and PFA, various resins such acrylic, urethane, PET and others. The form prior to mixing is not particularly limited, but an aqueous dispersion is preferred. In the case of a resin obtained by emulsion polymerization, a freshly-polymerized aqueous dispersion of the resin may be used without further modification, and a resin powder dispersed in an aqueous substance using a surfactant, etc. may also be used. An aqueous dispersion is prepared by dispersing a prescribed amount of the component C into water, such that the content thereof in the porous film is 0.1 wt. % or more and 20 wt. % or less.

The method for co-coagulation is not particularly limited, but after mixing the three aqueous dispersions, it is preferable to exert a mechanical stirring force.

After performing co-coagulation, dewatering and drying are performed, followed by adding and mixing a liquid lubricant (extrusion aid), and extrusion is carried out. The liquid lubricant is not particularly limited, as long as it can moisten the surfaces of PTFE powders, and it can be removed after the mixture obtained by co-coagulation is molded into a film form. Examples include liquid paraffin, naphtha, white oil, toluene, xylene, or other hydrocarbon oils, alcohols, ketones, esters and the like.

The mixture obtained by co-coagulation is mixed with a liquid lubricant, and then extruded and rolled by commonly known methods to be shaped into a film form. Extrusion may be carried out by paste extrusion, ram extrusion and the like, preferably by paste extrusion. The sheet form extrusion extruded by paste extrusion is rolled under heating, for example, under temperature of 40° C. or higher and 80° C. or lower using a calender roll, etc. The thickness of the film form rolled product obtained is determined on the basis of the target thickness of the porous film, and is ordinarily 100 µm or more and 400 µm or less.

Next, the liquid lubricant is removed from the rolled, unbaked film. Removal of the liquid lubricant may be carried out by a heating method or extraction method, or a combination thereof. In the case of a heating method, the heating temperature is not particularly limited as long as it is lower than the melting point of the non-fiberizable heat melt processable component, for example, 100° C. or higher and 250° C. or lower.

The rolled product having the liquid lubricant removed therefrom is stretched at a temperature equal to or higher than the melting point of the non-fiberizable heat melt processable component, and equal to or lower than the decomposition temperature of the non-fiberizable non-heat melt processable component. In the process, the non-fiberizable heat melt processable component melts, and subsequently solidifies in the nodes, and the strength of the porous film in the thickness direction thereby increases. The stretching temperature at this time may be determined by the temperature of the furnace where stretching is carried out, or by the temperature of the heating roller that conveys the rolled product, or may be realized by combining these determinations.

Stretching includes stretching in a first direction, and preferably stretching in a second direction orthogonal to the first direction. When using the porous film for an embossed filter medium for an air filter, it is preferable to perform stretching in the second direction as well. In the present embodiment, the first direction is the lengthwise direction (or the longitudinal direction) of the rolled product, and the second direction is the width direction (or the lateral direction) of the rolled product.

The rolled product is stretched at an elongation area ratio of 40 or more and 800 or less. The stretching rate in the first direction is preferably 10%/s or more and 600%/s or less, and more preferably 10%/s or more and 150%/s or less. The temperature during stretching is preferably 200° C. or more and 350° C. or less, and more preferably 280° C. or more and 310° C. or less.

The stretching rate in the second direction is preferably 10%/s or more and 600%/s or less. The temperature during stretching is preferably 200° C. or more and 400° C. or less, and more preferably 250° C. or more and 350° C. or less. Stretching in the second direction may be performed simultaneously with stretching in the first direction, or may be performed separately.

In relation to stretching of the rolled product (also referred to as an unbaked fluororesin product), it is known that the temperature during stretching, the stretching ratio, and the stretching rate have an impact on the physical properties of the stretched product. The S—S curve (graph showing the relationship between tensile force and elongation) for the unbaked fluororesin product shows unique characteristics that are different from those of other resins. Normally, in a resin material tensile force rises along with elongation. Parameters such as the range of an elastic region, the rupture point and the like differ depending on the material and the evaluation conditions, but it is exceedingly common that the tensile force exhibits a rising trend in association with the amount of elongation. In contrast, in an unbaked fluororesin product, the tensile force shows reaching a peak at a given amount of elongation, and then exhibits a gradual declining trend. This fact indicates that there is a "region where an unstretched portion is stronger than a stretched portion" in the unbaked fluororesin product.

Applying this fact to the behavior of a resin at the time of stretching, in the case of an ordinary resin, at the time of stretching, the weakest portion within the stretching plane begins to stretch, and as the stretched portion becomes stronger than the unstretched portion, the next-weakest unstretched portion begins to be stretched and the stretched region expands, leading to stretching the entire region. On the other hand, in the case of an unbaked fluororesin product, when a portion beginning to elongate reaches the "region where an unstretched portion is stronger than a stretched portion" mentioned above, the previously elongated portion is further stretched, and as a result, the unstretched portion remains in the form of a node (unstretched portion). When the stretching rate becomes slower, this phenomenon becomes remarkable, and larger nodes (unstretched portions) remain. By making use of such phenomenon at the time of stretching, physical properties of the stretched body are adjusted according to various applications.

In the present embodiment, it is preferable to obtain a stretched body having a lower density, and it is effective to apply a low stretching rate particularly to the first stretching. In the case of trying to obtain a molding having a low filling rate while leaving large nodes (unstretched portions), when conventional PTFE alone is used as a raw material, it is necessary for the stretching rate in the first direction to be 150%/s or less, preferably 80%/s or less, and that in the second direction to be 500%/s or less. However, the low filling rate structure of the molding obtained as such is easily impaired by an external force.

In the present embodiment, due to the presence of the non-fiberizable non-heat melt processable component, the phenomenon induced by the low stretching rate is more remarkable. As a result, the range of the stretching rate that can be applied can be expanded to a stretching rate in the first direction of 600%/s or less, and preferably 150%/s or less, and a stretching rate in the second direction of 600%/s or less. Moreover, due to the presence of the non-fiberizable heat melt processable component, the structure can be maintained even after post-processing.

The porous film obtained as such is preferably subjected to heat setting to obtain good mechanical strength and dimensional stability. The temperature at the time of heat setting may be equal to or higher than the melting point of PTFE or lower than the melting point of PTFE, and preferably 250° C. or higher and 400° C. or lower.

Note that when producing the PTFE porous film as the porous film, publicly known methods can be used.

Further, when obtaining the second porous film having different physical properties from those of the first porous film, it is possible to reduce the average pore diameter of the porous film obtained by modifying the amount of liquid lubricant in relation to 100 weight parts of fluororesin to be lower at the time of producing the second porous film rather than at the time of producing the first porous film, and to obtain a second porous film having a larger pressure loss than that of the first porous film and a higher collection efficiency than that of the first porous film. In this case, the difference in the amount of liquid lubricant in relation to 100 weight parts of fluororesin (difference in amount of liquid lubricant or difference in amount of aid) is preferably 1 part by weight or more and 4 weight parts or less. By having the difference in amount of the aid be 1 part by weight or more, it is possible to create an adequate average pore diameter difference between two porous films. By having the difference in amount of the aid be 4 weight parts or less, it is possible to reduce degradation of the stretching homogeneity. The stretching homogeneity means that, in a porous film produced using the stretching process, there are little variations in features such as the collection efficiency, pressure loss and the like and these features are uniform throughout the entire porous film. The difference in amount of liquid lubricant is, for example, 2 weight parts.

The amounts of the liquid lubricant used when producing the first porous film and when producing the second porous film are each preferably 30 weight parts or more and 37 weight parts or less in relation to 100 weight parts of fluororesin. By using an amount of 30 weight parts or more, it is possible to reduce the pressure loss, and to have the pressure loss of the entire filter medium of less than 200 Pa. Moreover, by using an amount of 37 weight parts or less, it is possible to ensure moldability of a raw tape as will be described later, and it is possible to prevent the pore diameter of the first porous film from becoming too large allowing microparticles to pass through without being collected and to flow to the downstream side, which increases the collecting load of the second porous film on the downstream side.

In particular, it is preferable that the amount of the liquid lubricant used when producing the first porous film be, for example, 34 to 36 weight parts in relation to 100 weight parts of fluororesin. For example, within the range that meets the difference of the amount of the liquid lubricant of 1 to 4 weight parts, by using 34 to 36 weight parts of the liquid lubricant to produce the first porous film in contrast to using 31 to 34 weight parts thereof to produce the second porous film, it is possible to significantly enhance the dust holding capacity of the filter medium.

It is possible to produce the first porous film and the second porous film by first producing an unbaked film (hereinafter also referred to as a "raw tape") by a publicly known method, and then to perform biaxial stretching.

Note that creating a difference in the average pore diameter between the two porous films can also be achieved by differentiating the blending ratios of the three components mentioned above between the two porous films.

Note that supposing that the first porous film and the second porous film having physical properties mentioned above are commercially available, the porous films can be commercially obtained.

In each of the steps (b), (c), (d) and (e), method of arrangement is not particularly limited.

The step of integrating the first porous film, the second porous film, and the pre-collection member by performing heat lamination is not particularly limited. It is possible to integrate all of the first porous film, the second porous film, and the pre-collection member in one heat lamination process, or it is also possible to integrate adjoining items by heat lamination first, and then by repeating this process, to integrate all of the first porous film, the second porous film, and the pre-collection member.

The step of integrating the first porous film, the second porous film, the upstream air-permeable supporting material, and the pre-collection member by heat lamination is not particularly limited. It is possible to integrate all of the first porous film, the second porous film, the upstream air-permeable supporting material, and the pre-collection member in one heat lamination process, or it is also possible to integrate adjoining items by heat lamination first, and then by repeating this process, to integrate all of the first porous film, the second porous film, the upstream air-permeable supporting material, and the pre-collection member.

Integration of the downstream air-permeable supporting material can be perform in the same manner as that for the upstream air-permeable supporting material.

The method of laminating each of the layers of the filter medium for an air filter 1 having a 5-layer structure shown in FIG. 1 is not particularly limited. For example, when joining the first porous film and the second porous film, a raw tape to become the first porous film and a raw tape to become the second porous film are produced and dried separately, and then the raw tapes are overlapped and biaxially stretched (longitudinally and transversely stretched) to complete the joining. In this case, the first porous film and the second porous film are heated each time stretching is performed in an overlapped state, and since heat is applied twice, the two porous films are tightly adhered with each other, and peeling of the two porous films at the interface in later processes can be reduced. Moreover, instead of using this method, joining can be performed by performing, after performing longitudinal stretching, lateral stretching on two overlapped films to be two porous films. Moreover, joining porous films with each other can be done by heating PTFE to a temperature close to the melting point. Further, as the upstream air-permeable supporting material and the downstream air-permeable supporting material, it is possible to use the nonwoven fabric, woven fabric, metal mesh, resin net and the like mentioned above can be used. Here, when a nonwoven fabric or the like is used as the upstream air-permeable supporting material, it is possible to join the upstream air-permeable supporting material to the first porous film by utilizing an anchor effect induced by partial melting of the upstream air-permeable supporting material by adding heat or by melting of a hot-melt resin, or by utilizing adhesion using a reactive adhesive and the like. The downstream air-permeable supporting material can be joined to the second porous film in the same manner. Moreover, when a nonwoven fabric or the like is used as the pre-collection member, it is also possible to join the pre-collection member to the upstream air-permeable supporting material by utilizing an anchor effect induced by partial melting of the pre-collection member by adding heat or by melting of a hot-melt resin, or by utilizing adhesion using a reactive adhesive and the like.

The method of laminating each of the layers of the filter medium for an air filter 2 having a 6-layer structure shown in FIG. 2 is not particularly limited. For example, two porous films are each produced, and one of the two porous films is placed between the upstream air-permeable supporting material and the middle-stream air-permeable supporting material, and by performing heat lamination, it is possible to obtain a 3-layer structure. Then, the remaining other porous film can be joined to the 3-layer structure by heat lamination while performing lateral stretching. By further performing heat lamination of the downstream air-permeable supporting material on the second porous film, it is possible to join the downstream air-permeable supporting material to the second porous film. Moreover, when a nonwoven fabric or the like is used as the pre-collection member, it is also possible to join the pre-collection member to the upstream air-permeable supporting material by utilizing an anchor effect induced by partial melting of the pre-collection member by adding heat or by melting of a hot-melt resin, or by utilizing adhesion using a reactive adhesive and the like.

The method of laminating each of the layers of the filter medium for an air filter 3 having a 3-layer structure shown in FIG. 3 is not particularly limited. For example, when joining the first porous film and the second porous film mentioned above, it is possible to perform the joining by a method similar to that for the filter medium for an air filter 1 having a 5-layer structure. Further, when a nonwoven fabric or the like is used as the pre-collection member, it is also possible to join the pre-collection member to the upstream side of the first porous film by utilizing an anchor effect induced by partial melting of the pre-collection member by adding heat or by melting of a hot-melt resin, or by utilizing adhesion using a reactive adhesive and the like.

Note that, since pressure is applied to the first porous film, the second porous film, the upstream air-permeable supporting material, the downstream air-permeable supporting material, and the pre-collection member (and further the middle-stream air-permeable supporting material in the case of filter medium for an air filter 2), the film thickness of the filter medium for an air filter obtained by lamination is not a simple total of the thicknesses of the layers, but falls within a range between 85% or more and 100% or less of the simple total of the thicknesses of the layers.

EXAMPLES

The present invention is described in detail below using examples and comparative examples.

Example 1

After 66.5 wt. % (polymer conversion) of a PTFE aqueous dispersion having an SSG of 2.160 (PTFE-A), 28.5 wt. % (polymer conversion) of a low-molecular weight PTFE aqueous dispersion having a melt viscosity of 20,000 Pa·s (PTFE-B) measured at 380° C. using a flow tester method, and 5 wt. % (polymer conversion) of an FEP aqueous dispersion having a melting point of 215° C. were mixed, 500 ml of a 1% aluminum nitrate aqueous solution was added to the resulting mixture as a coagulant, and co-coagulation was performed by stirring. A powder thus prepared was drained with a sieve, then further dried in a hot air drying furnace at 135° C. for 18 hours, to obtain a mixed powder of the three components mentioned above.

Then, hydrocarbon oil (IP SOLVENT 2028 manufactured by Idemitsu Kosan Co., Ltd.) was added to the mixed powder as a liquid lubricant (extrusion aid) in an amount of 35 weight parts per 100 weight parts of the mixed powder, and mixed at 20° C. Then, the mixture obtained was extruded using a paste extrusion device, to obtain a sheet-shaped molding. To the tip portion of the paste extrusion device was attached a sheet die where a rectangular extrusion opening that is 2 mm long in the lateral direction and 150 mm long in the longitudinal direction was formed. This sheet-shaped molding was molded into a film shape with a calender roll heated to 70° C., and a fluororesin film was obtained. This film was passed through a hot air drying furnace heated to 200° C. to evaporate and remove the hydrocarbon oil, and an unbaked fluororesin film (a first raw tape) in the form of a strip having an average thickness of 300 µm and an average width of 150 mm was obtained. Moreover, except that the mixing amount of the liquid lubricant was 33 weight parts, an unbaked fluororesin film (a second raw tape) in the form of a strip having an average thickness of 300 µm and an average width of 150 mm was obtained similarly to the first raw tape.

Then, the first raw tape and the second raw tape were stacked and were stretched in the longitudinal direction (lengthwise direction) to be 6.5 times longer than the original length. The stretching temperature was 300° C. Then, the stacked and stretched raw tapes were stretched in the width direction (lateral direction) to be 13.5 times longer than the original length using a tenter capable of continuously clipping, and heat setting was performed. At this time, the stretching temperature was 290° C. and the heat setting temperature was 390° C. Thereby, a multi-layer porous film with the first porous film 31 and the second porous film 32 stacked together was obtained.

As the downstream air-permeable supporting material 22 shown in FIG. 4, a spunbond nonwoven fabric (having an average fiber diameter of 20 µm, a weight per unit area of 40 g/m², and a thickness of 0.2 mm) composed of fibers with a core/sheath structure using PET for the core and PE for the sheath was used.

The spunbond nonwoven fabric was arranged as the downstream air-permeable supporting material 22 on the side of the second porous film 32 of the multi-layer porous film obtained, and joining was performed by thermal fusion bonding using a laminating device to obtain a fluororesin laminated body of Example 1.

A glass fiber-filter medium was used as the pre-collection member 10. The glass fiber-filter medium had a pressure loss of 9 Pa when air was passed through the filter medium at a flow rate of 5.3 cm/s, a collection efficiency of 32.3% for NaCl particles having a particle diameter of 0.3 µm when air containing the NaCl particles was passed through the filter medium at a flow rate of 5.3 cm/s, a collection efficiency per unit of thickness of 0.070%/µm for NaCl particles having a particle diameter of 0.3 µm when air containing the NaCl particles was passed through the filter medium at a flow rate of 5.3 cm/s, a thickness of 0.56 mm, and a weight per unit area of 63.0 g/m².

The fluororesin laminated body of Example 1 mentioned above and a glass fiber-filter medium that is the pre-collection member 10 arranged on the side of the upstream air-permeable supporting material 21 underwent heat lamination at 120° C. using 5 g/m² of an ethylene-vinyl acetate copolymer (EVA) hot-melt adhesive, to obtain the filter medium for an air filter 4 having the layer constitution shown in FIG. 4. The thickness of the filter medium 1 was 0.77 mm.

The filter medium 4 had a pressure loss of 146 Pa and a collection efficiency of 99.997%. There was no rise in pressure loss due to heat lamination. The pressure loss and collection efficiency are basically characteristics of the pre-collection member 10, the first porous film 31, and the second porous film 32.

The prepared filter medium 4 underwent a pleating process by a rotary folding machine so as to have mountain folds and valley folds for every 260 mm, and thereby creating a processed filter medium having a zigzag configuration as shown in FIG. 6. Then, a separator obtained by performing a corrugating process on an aluminum plate was inserted in the valley parts of the filter medium 4 to obtain a filter pack 40 having a vertical length of 590 mm and a horizontal length of 590 mm. The number of pleats at this time was 79.

The obtained filter pack 40 was fixed to an aluminum frame 50 having an external dimension of 610 mm×610 mm (vertical length×horizontal length), internal dimension of 580 mm×580 mm (vertical length×horizontal length), and a depth of 290 mm. The periphery of the filter pack was adhered to a frame 50 using a urethane adhesive and was sealed, and the air filter unit 60 was obtained.

Example 2

This example is the same as Example 1, except that, instead of the glass fiber-filter medium as the pre-collection member 10 of Example 1, a glass fiber-filter medium having a pressure loss of 14 Pa when air was passed through the filter medium at a flow rate of 5.3 cm/s, a collection efficiency of 39.8% for NaCl particles having a particle diameter of 0.3 μm when air containing the NaCl particles was passed through the filter medium at a flow rate of 5.3 cm/s, a collection efficiency per unit of thickness of 0.088%/μm for NaCl particles having a particle diameter of 0.3 μm when air containing the NaCl particles was passed through the filter medium at a flow rate of 5.3 cm/s, a thickness of 0.58 mm, and a weight per unit area of 59.0 g/m², was used.

Example 3

This example is the same as Example 1, except that, instead of the glass fiber-filter medium as the pre-collection member 10 of Example 1, a glass fiber-filter medium having a pressure loss of 32 Pa when air was passed through the filter medium at a flow rate of 5.3 cm/s, a collection efficiency of 56.0% for NaCl particles having a particle diameter of 0.3 μm when air containing the NaCl particles was passed through the filter medium at a flow rate of 5.3 cm/s, a collection efficiency per unit of thickness of 0.183%/μm for NaCl particles having a particle diameter of 0.3 μm when air containing the NaCl particles was passed through the filter medium at a flow rate of 5.3 cm/s, a thickness of 0.45 mm, and a weight per unit area of 64.1 g/m², was used.

Example 4

This example is the same as Example 1, except that, instead of the glass fiber-filter medium as the pre-collection member 10 of Example 1, a glass fiber-filter medium having a pressure loss of 31 Pa when air was passed through the filter medium at a flow rate of 5.3 cm/s, a collection efficiency of 68.5% for NaCl particles having a particle diameter of 0.3 μm when air containing the NaCl particles was passed through the filter medium at a flow rate of 5.3 cm/s, a collection efficiency per unit of thickness of 0.206%/μm for NaCl particles having a particle diameter of 0.3 μm when air containing the NaCl particles was passed through the filter medium at a flow rate of 5.3 cm/s, a thickness of 0.56 mm, and a weight per unit area of 64.9 g/m², was used.

Example 5

This example is the same as Example 1, except that, instead of the glass fiber-filter medium as the pre-collection member 10 of Example 1, a glass fiber-filter medium having a pressure loss of 40 Pa when air was passed through the filter medium at a flow rate of 5.3 cm/s, a collection efficiency of 74.0% for NaCl particles having a particle diameter of 0.3 μm when air containing the NaCl particles was passed through the filter medium at a flow rate of 5.3 cm/s, a collection efficiency per unit of thickness of 0.290%/μm for NaCl particles having a particle diameter of 0.3 μm when air containing the NaCl particles was passed through the filter medium at a flow rate of 5.3 cm/s, a thickness of 0.46 mm, and a weight per unit area of 56.8 g/m², was used.

Example 6

This example is the same as Example 1, except that, instead of the glass fiber-filter medium as the pre-collection member 10 of Example 1, a glass fiber-filter medium having a pressure loss of 31 Pa when air similar to that of Example 4 was passed through the filter medium at a flow rate of 5.3 cm/s, a collection efficiency of 68.5% for NaCl particles having a particle diameter of 0.3 μm when air containing the NaCl particles was passed through the filter medium at a flow rate of 5.3 cm/s, a collection efficiency per unit of thickness of 0.206%/μm for NaCl particles having a particle diameter of 0.3 μm when air containing the NaCl particles was passed through the filter medium at a flow rate of 5.3 cm/s, a thickness of 0.56 mm, and a weight per unit area of 64.9 g/m², was used, and except that porous films having the same features as those of the second porous film 32 of Example 1 were used as the first porous film 31 and the second porous film 32.

Example 7

This example is the same as Example 4, except that a spun-bond nonwoven fabric (having an average fiber diameter of 20 μm, a weight per unit area of 40 g/m², and a thickness of 0.2 mm) was further provided between the first porous film 31 and the second porous film 32 of Example 4 as a middle-stream air-permeable supporting material 23, and heat lamination was performed (as indicated in the constitution of the filter medium 2 shown in FIG. 2).

Specifically, the second porous film 32 obtained by stretching the second raw tape of Example 1 in the lengthwise direction and in the lateral direction was placed between the downstream air-permeable supporting material 22 and the middle-stream air-permeable supporting material 23, and was joined by thermal fusion bonding using a laminating device to obtain a first fluororesin laminated body of Example 7. Further, the first porous film 31 obtained by stretching the first raw tape of Example 1 in the lengthwise direction and in the lateral direction was stacked on the first fluororesin laminated body on the windward side and was joined by thermal fusion bonding using a laminating device to obtain a second fluororesin laminated body of Example 7. Further, a pre-collection member 10 similar to that of Example 4 and the second fluororesin laminated body of Example 7 were joined together by performing heat lamination with a laminating device at 120° C. using an ethylene-vinyl acetate copolymer (EVA) hot-melt adhesive to obtain a filter medium for an air filter 2 having a layer constitution shown in FIG. 5.

Moreover, the processes for obtaining the filter pack 40 and the air filter unit 60 by a pleating process are the same as those of Example 1.

Example 8

This example is the same as Example 6, except that, instead of the glass fiber-filter medium as the pre-collection member 10 of Example 6, a glass fiber-filter medium having a pressure loss of 30 Pa when air was passed through the filter medium at a flow rate of 5.3 cm/s, a collection efficiency of 68.0% for NaCl particles having a particle diameter of 0.3 µm when air containing the NaCl particles was passed through the filter medium at a flow rate of 5.3 cm/s, a collection efficiency per unit of thickness of 0.124%/m for NaCl particles having a particle diameter of 0.3 µm when air containing the NaCl particles was passed through the filter medium at a flow rate of 5.3 cm/s, a thickness of 0.92 mm, and a weight per unit area of 125.3 g/m$^2$, was used.

Example 9

This example is the same as Example 6, except that, instead of the glass fiber-filter medium as the pre-collection member 10 of Example 6, a glass fiber-filter medium having a pressure loss of 45 Pa when air was passed through the filter medium at a flow rate of 5.3 cm/s, a collection efficiency of 55.1% for NaCl particles having a particle diameter of 0.3 µm when air containing the NaCl particles was passed through the filter medium at a flow rate of 5.3 cm/s, a collection efficiency per unit of thickness of 0.072%/µm for NaCl particles having a particle diameter of 0.3 µm when air containing the NaCl particles was passed through the filter medium at a flow rate of 5.3 cm/s, a thickness of 1.11 mm, and a weight per unit area of 158.5 g/m$^2$, was used.

Comparative Example 1

While using the same first porous film 31, second porous film 32, and downstream air-permeable supporting material 22 as those of Example 1, and further providing an upstream air-permeable supporting material 21, a "multi-layer porous film stacked with the first porous film 31 and the second porous film 32" was placed between a spunbond nonwoven fabric as the upstream air-permeable supporting material 21 and a spunbond nonwoven fabric as the downstream air-permeable supporting material 22, and the "multi-layer porous film stacked with the first porous film 31 and the second porous film 32" was joined by thermal fusion bonding using a laminating device to obtain a fluororesin laminated body.

The fluororesin laminated body obtained as such had a pressure loss of 131 Pa and a collection efficiency of 99.997%. The pressure loss and the collection efficiency are basically properties derived from the first porous film 31 and the second porous film 32, since the upstream air-permeable supporting material 21 and the downstream air-permeable supporting material 22 do not substantially contribute to the properties.

Moreover, the processes for obtaining the filter pack 40 and the air filter unit 60 by a pleating process are the same as those of Example 1.

Comparative Example 2

Hydrocarbon oil (IP SOLVENT 2028 manufactured by Idemitsu Kosan Co. Ltd.), as an extrusion liquid lubricant, was added to a PTFE fine powder having an average molecular weight of 6,500,000 (Polyflon Fine Powder F106 manufactured by Daikin Industries) in an amount of 33.5 mass percent per 1 kilogram of PTFE fine powder at 20° C. and mixed. Then, the mixture obtained was extruded using a paste extrusion device to obtain a round bar-shaped molding. The round bar-shaped molding was molded into a film shape by a calender roll heated to 70° C. to obtain a PTFE film. The film was passed through a hot air drying furnace at 250° C. to evaporate and remove the hydrocarbon oil and an unbaked PTFE film in the form of a strip having an average thickness of 200 µm and an average width of 150 mm was obtained. Then, the unbaked PTFE film was stretched in the longitudinal direction at a stretching ratio of 5. The stretching temperature was 250° C. Then, using a tenter capable of continuously clipping the stretched unbaked film, the film was stretched in the width direction at a stretching ratio of 32, and heat setting was carried out. At this time, the stretching temperature was 290° C. and the heat setting temperature was 390° C. Thereby, a PTFE porous film (having a filling rate: 4.0%, an average fiber diameter of 0.069 µm, and a thickness of 0.009 µm) was obtained.

As an air-permeable support layer, a spunbond nonwoven fabric (having an average fiber diameter of 20 µm, weight per unit area of 40 g/m$^2$ and a thickness of 0.20 mm) composed of fibers having a core/sheath structure using PET as the core and PE as the sheath was used.

On both sides of the obtained PTFE porous film, the spunbond nonwoven fabrics mentioned above as the upstream air-permeable supporting material 21 and the downstream air-permeable supporting material 22 were joined by thermal fusion bonding using a laminating device to obtain a PTFE laminated body. The PTFE laminated body thus obtained had a pressure loss of 118 Pa and a collection efficiency of 99.998% according to the measurement method mentioned above. The pressure loss and the collection efficiency are basically properties of the PTFE porous film.

Moreover, the processes for obtaining the filter pack 40 and the air filter unit 60 by a pleating process are the same as those of Example 1.

Comparative Example 3

This comparative example is the same as Comparative Example 2, except that a pre-collection member 10 similar to that of Example 4 was further provided to the PTFE laminated body of Comparative Example 2.

Here, the PTFE laminated body of Comparative Example 2 and a glass fiber-filter medium that was a pre-collection member 10 similar to that of Example 4 were heat laminated at 120° C. using 5 g/m$^2$ of an ethylene-vinyl acetate copolymer (EVA) hot-melt adhesive, to obtain the laminated body.

Thereby, a filter medium for an air filter having a 4-layer structure was obtained. Thickness of the filter medium was 0.69 mm.

Moreover, the processes for obtaining the filter pack 40 and the air filter unit 60 by a pleating process are the same as those of Example 1.

Comparative Example 4

A glass filter medium can be produced by methods disclosed in, for example, Japanese Laid-open Patent Publication No. 2007-7586, Japanese Laid-open Patent Publication No. H05-123513, and Japanese Registered Patent Publication No. 3014440.

The glass filter medium can be produced from a slurry where glass fibers are dispersed in water using a paper machine by transporting the glass fibers in water. The paper machine may be a machine for producing general purpose paper or wet nonwoven fabrics, for example, a combination machine combining two same or different machines selected from a Fourdrinier paper machine, a cylinder paper machine, a tilted wire type paper machine and the like. Bindings between fibers using a binder may be performed by directly attaching the binder to the glass fibers, or may be carried out by pregnating the glass fibers with a binder solution where a binder is dissolved in a solvent, followed by drying the impregnated fibers. A publicly known binder can be used, such as an acrylic resin, phenol resin and the like.

In Comparative Example 4, a HEPA filter medium for an air filter manufactured by by Hokuetsu Paper Co., Ltd. was used as the glass filter medium mentioned above.

Moreover, the processes for obtaining the filter pack 40 and the air filter unit 60 by a pleating process are the same as those of Example 1.

Comparative Example 5

This comparative example is the same as Example 6, except that the pre-collection member 10 was not provided, but the upstream air-permeable supporting material 21 and the middle-stream air-permeable supporting material 23 were provided.

Specifically, using the first porous film 31, the second porous film 32, and the downstream air-permeable supporting material 22 having properties of each layer of Example 6, and using a spunbond nonwoven fabric (having an average fiber diameter of 20 μm, a weight per unit area of 30 g/m², and a thickness of 0.16 mm) as the upstream air-permeable supporting material 21, and the middle-stream air-permeable supporting material of Example 7, a filter medium for an air filter of Comparative Example 5 was obtained by laminating and bonding these materials.

Moreover, the processes for obtaining the filter pack 40 and the air filter unit 60 by a pleating process are the same as those of Example 1.

Comparative Example 6

This comparative example is the same as Example 1, except that, instead of the glass fiber-filter medium as the pre-collection member 10 of Example 1, a glass fiber-filter medium having a pressure loss of 8 Pa when air was passed through the filter medium at a flow rate of 5.3 cm/s, a collection efficiency of 13.1% for NaCl particles having a particle diameter of 0.3 μm when air containing the NaCl particles was passed through the filter medium at a flow rate of 5.3 cm/s, a collection efficiency per unit of thickness of 0.027%/μm for NaCl particles having a particle diameter of 0.3 μm when air containing the NaCl particles was passed through the filter medium at a flow rate of 5.3 cm/s, a thickness of 0.513 mm, and a weight per unit area of 65.4 g/m², was used, and except that the upstream air-permeable supporting material 21 of Comparative Example 1 was further used.

Comparative Example 7

This comparative example is the same as Example 1, except that, instead of the glass fiber-filter medium as the pre-collection member 10 of Example 1, a glass fiber-filter medium having a pressure loss of 131 Pa when air was passed through the filter medium at a flow rate of 5.3 cm/s, a collection efficiency of 96.9% for NaCl particles having a particle diameter of 0.3 μm when air containing the NaCl particles was passed through the filter medium at a flow rate of 5.3 cm/s, a collection efficiency per unit of thickness of 0.742%/μm for NaCl particles having a particle diameter of 0.3 μm when air containing the NaCl particles was passed through the filter medium at a flow rate of 5.3 cm/s, a thickness of 0.467 mm, and a weight per unit area of 71.8 g/m², was used, and except that the upstream air-permeable supporting material 21 of Comparative Example 1 was further used.

Comparative Example 8

This comparative example is the same as Example 1, except that, instead of the glass fiber-filter medium as the pre-collection member 10 of Example 1, a glass fiber-filter medium having a pressure loss of 54 Pa when air was passed through the filter medium at a flow rate of 5.3 cm/s, a collection efficiency of 68.0% for NaCl particles having a particle diameter of 0.3 μm when air containing the NaCl particles was passed through the filter medium at a flow rate of 5.3 cm/s, a collection efficiency per unit of thickness of 0.298%/μm for NaCl particles having a particle diameter of 0.3 μm when air containing the NaCl particles was passed through the filter medium at a flow rate of 5.3 cm/s, a thickness of 0.381 mm, and a weight per unit area of 48.0 g/m², was used, and except that the upstream air-permeable supporting material 21 of Comparative Example 1 was further used.

(Pressure Loss)

A measurement sample of the filter medium was set to a filter holder having a diameter of 100 mm, the inlet port side was pressurized with a compressor, and the flow of air passing through the filter medium was adjusted to 5.3 cm/s with a flowmeter. Then, the pressure loss at that time was measured using a manometer.

(Collection Efficiency for NaCl Particles Having a Particle Diameter of 0.3 μm)

According to a method disclosed in the NaCl aerosol generating method (pressurized spray method) of JIS B9928, Appendix 5 (Provisions), NaCl particles generated by an atomizer were classified to a diameter of 0.3 μm with an electrostatic classifier (manufactured by TSI Corp.), and after using americium 241 to neutralize the particle charge, the flow passing through was adjusted to 5.3 cm/s, the numbers of particles in front of and behind the filter medium which was the measurement sample was found using a particle counter (CNC manufactured by TSI Corp.), and the collection efficiency was calculated using the following formulae.

$$\text{Collection efficiency (\%)} = (CO/CI) \times 100$$

CO=Number of 0.3-μm NaCl particles collected by the measurement sample

CI=Number of 0.3-μm NaCl particles supplied to the measurement sample (Dust Holding Capacity for Polyalphaolefin Particles)

Pressure loss of a filter medium when polyalphaolefin (PAO) particles (liquid particles) were passed through a filter medium was evaluated by a test for measuring pressure loss increase when PAO particles are passed. In other words, the pressure loss of a sample filter medium having an effective filtration area of 50 cm² when air containing PAO particles was continuously passed through the sample filter medium at a flow rate of 5.3 cm/s was measured over time by a differential pressure gauge (U shaped tube manometer), and when the pressure loss increased by 250 Pa, the dust holding capacity (g/m²) which is the weight of PAO particles held in the filter medium per unit area of the filter medium was calculated. Further, PAO particles (having a count median diameter of 0.25 μm) generated by a Laskin nozzle were used as the PAO particles, and the density of the PAO particles was approximately 1,000,000 to 6,000,000 particles/cm³.

The dust holding capacity is not defined for a HEPA filter medium, but the initial pressure loss of a filter is generally about 250 Pa or less for a HEPA unit, and the recommended time for replacing a filter is generally at the time when the pressure loss exceeds twice the initial pressure loss of the filter. Moreover, the initial pressure loss of a standard HEPA glass filter medium is about 250 to 300 Pa. As such, termination of the test mentioned above for evaluating the dust holding capacity of a filter medium was set at the time when the pressure loss increased by 250 Pa.

The dust holding capacity for polyalphaolefin particles was measured for each of the entire filter media, the first porous film and the second porous film.

(Dust Holding Capacity for NaCl Particles)

Pressure loss of a filter medium when NaCl particles (solid particles) were passed through the filter medium was evaluated by a test for measuring pressure loss increase when NaCl particles were passed. In other words, the pressure loss of a sample filter medium having an effective filtration area of 50 cm² when air containing NaCl particles was continuously passed through the sample filter medium at a flow rate of 5.3 cm/s was measured over time by a differential pressure gauge (U shaped tube manometer), and when the pressure loss increased by 250 Pa, the dust holding capacity (g/m²) which is the weight of NaCl particles held in the filter medium per unit area of the filter medium was calculated. Further, NaCl particles (having a count median diameter of 0.1 μm) generated by an atomizer were used as the NaCl particles, and the density of the NaCl particles was approximately 5,000,000 to 7,000,000 particles/cm³.

Note that, similarly to measuring the dust holding capacity for polyalphaolefin particles, termination of the test mentioned above for evaluating the dust holding capacity of a filter medium was set at the time when the pressure loss increased by 250 Pa.

(Thickness of Porous Film)

Five measuring targets, i.e., films, were stacked on one over another and the film thickness of the entire films was measured using a film thickness meter (ID-110MH model manufactured by Mitutoyo Corp.). The value obtained was divided by 5 and the resulting value was regarded as the film thickness of the film.

(Film Thickness of Each Layer Other than the Porous Films Prior to Joining, and Film Thickness of the Entire Filter Medium)

An ABS digimatic indicator (ID-C112CX manufactured by Mitutoyo Corp.) was fixed to a gauge stand, and values of thickness of the measuring targets when a load of 0.3 N was applied thereon were read.

Values obtained along with figures showing properties of each material used to prepare each filter medium for an air filter regarding a filter medium for an air filter of each example and each comparative example (before being used as a filter pack or an air filter unit) are shown in Table 1, Table 2, Table 3, and Table 4 below.

TABLE 1

| | Contents | Example 1 | Example 2 | Example 3 | Example 4 |
|---|---|---|---|---|---|
| Pre-collection member | Weight per unit area (g/m²) | 63.0 | 59.0 | 64.1 | 64.9 |
| | Thickness (mm) | 0.56 | 0.58 | 0.45 | 0.56 |
| | Collection efficiency (%) (Particle diameter 0.3 μm) | 32.3 | 39.8 | 56.0 | 68.5 |
| | Collection efficiency per unit thickness (%/μm) | 0.070 | 0.088 | 0.183 | 0.206 |
| | Pressure loss (Pa) | 9 | 14 | 32 | 31 |
| Upstream air permeable supporting material | Weight per unit area (g/m²) | | | | |
| | Thickness (mm) | | | | |
| | Collection efficiency (%) (Particle diameter 0.3 μm) | | | | |
| | Pressure loss (Pa) | | | | |
| First porous film | Component(s) | 3 components | 3 components | 3 components | 3 components |
| | Thickness (mm) | 0.05 | 0.05 | 0.05 | 0.05 |
| | Pressure loss (Pa) | 60 | 60 | 60 | 60 |
| | Collection efficiency (%) (Particle diameter 0.3 μm) | 99 | 99 | 99 | 99 |
| | Dust holding capacity (PHC, 250 Pa) (g/m²) | 26.5 | 26.5 | 26.5 | 26.5 |
| Middlestream air permeable supporting material | Weight per unit area (g/m²) | | | | |
| | Thickness (mm) | | | | |
| | Collection efficiency (%) (Particle diameter 0.3 μm) | | | | |
| | Pressure loss (Pa) | | | | |
| Second porous film | Component(s) | 3 components | 3 components | 3 components | 3 components |
| | Thickness (mm) | 0.05 | 0.05 | 0.05 | 0.05 |
| | Pressure loss (Pa) | 70 | 70 | 70 | 70 |
| | Collection efficiency (%) (Particle diameter 0.3 μm) | 99.7 | 99.7 | 99.7 | 99.7 |
| | Dust holding capacity (PHC, 250 Pa) (g/m²) | 22 | 22 | 22 | 22 |
| Downstream air permeable supporting material | Weight per unit area (g/m²) | 40 | 40 | 40 | 40 |
| | Thickness (mm) | 0.2 | 0.2 | 0.2 | 0.2 |
| | Collection efficiency (%) (Particle diameter 0.3 μm) | 0 | 0 | 0 | 0 |
| | Pressure loss (Pa) | <10 | <10 | <10 | <10 |

TABLE 1-continued

|  | Contents | Example 1 | Example 2 | Example 3 | Example 4 |
|---|---|---|---|---|---|
| Entire filter medium | Layer structure | 4 | 4 | 4 | 4 |
|  | Pressure loss (Pa) | 146 | 150 | 163 | 165 |
|  | Collection efficiency (%) (Particle diameter 0.3 μm) | 99.997 | 99.999 | 99.998 | 99.999 |
|  | Thickness (mm) | 0.77 | 0.79 | 0.67 | 0.77 |
|  | Dust holding capacity (PHC, 250 Pa) (g/m$^2$) | 51.8 | 68.9 | 61.0 | 115.4 |
|  | Dust holding capacity (DHC, 250 Pa) (g/m$^2$) | 6.2 | 8.6 | 13.5 | 28.6 |

TABLE 2

|  | Contents | Example 5 | Example 6 | Example 7 | Example 8 | Example 9 |
|---|---|---|---|---|---|---|
| Pre-collection member | Weight per unit area (g/m$^2$) | 56.8 | 64.9 | 64.9 | 125.3 | 158.5 |
|  | Thickness (mm) | 0.46 | 0.56 | 0.56 | 0.92 | 1.11 |
|  | Collection efficiency (%) (Particle diameter 0.3 μm) | 74.0 | 68.5 | 68.5 | 68.0 | 55.1 |
|  | Collection efficiency per unit thickness (%/μm) | 0.290 | 0.206 | 0.206 | 0.124 | 0.072 |
|  | Pressure loss (Pa) | 40 | 31 | 31 | 30 | 45 |
| Upstream air permeable supporting material | Weight per unit area (g/m$^2$) Thickness (mm) Collection efficiency (%) (Particle diameter 0.3 μm) Pressure loss (Pa) |  |  |  |  |  |
| First porous film | Component(s) | 3 components | 3 components | 3 components | 3 components | 3 components |
|  | Thickness (mm) | 0.05 | 0.05 | 0.05 | 0.05 | 0.05 |
|  | Pressure loss (Pa) | 60 | 70 | 60 | 70 | 70 |
|  | Collection efficiency (%) (Particle diameter 0.3 μm) | 99.7 | 99.7 | 99 | 99.7 | 99.7 |
|  | Dust holding capacity (PHC, 250 Pa) (g/m$^2$) | 22 | 22 | 26.5 | 22 | 22 |
| Middlestream airpermeable supporting material | Weight per unit area (g/m$^2$) |  |  | 30 |  |  |
|  | Thickness (mm) |  |  | 0.16 |  |  |
|  | Collection efficiency (%) (Particle diameter 0.3 μm) |  |  | 0 |  |  |
|  | Pressure loss (Pa) |  |  | <10 |  |  |
| Second porous film | Component(s) | 3 components | 3 components | 3 components | 3 components | 3 components |
|  | Thickness (mm) | 0.05 | 0.05 | 0.05 | 0.05 | 0.05 |
|  | Pressure loss (Pa) | 70 | 70 | 70 | 70 | 70 |
|  | Collection efficiency (%) (Particle diameter 0.3 μm) | 99.7 | 99.7 | 99.7 | 99.7 | 99.7 |
|  | Dust holding capacity (PHC, 250 Pa) (g/m$^2$) | 22 | 22 | 22 | 22 | 22 |
| Downstream air permeable supporting material | Weight per unit area (g/m$^2$) | 40 | 40 | 30 | 40 | 40 |
|  | Thickness (mm) | 0.2 | 0.2 | 0.16 | 0.2 | 0.2 |
|  | Collection efficiency (%) (Particle diameter 0.3 μm) | 0 | 0 | 0 | 0 | 0 |
|  | Pressure loss (Pa) | <10 | <10 | <10 | <10 | <10 |
| Entire filter medium | Layer structure | 4 | 4 | 5 | 4 | 4 |
|  | Pressure loss (Pa) | 175 | 175 | 172 | 176 | 185 |
|  | Collection efficiency (%) (Particle diameter 0.3 μm) | 99.998 | 99.999 | 99.999 | 99.999 | 99.998 |
|  | Thickness (mm) | 0.69 | 0.77 | 0.74 | 1.10 | 1.27 |
|  | Dust holding capacity (PHC, 250 Pa) (g/m$^2$) | 99.0 | 93.4 | 115.4 | 121.8 | 83.9 |
|  | Dust holding capacity (DHC, 250 Pa) (g/m$^2$) | 7.0 | 28.2 | 28.6 | 14.8 | 10.8 |

TABLE 3

|  | Contents | Comparative Example 1 | Comparative Example 2 | Comparative Example 3 | Comparative Example 4 (glass filter medium) |
|---|---|---|---|---|---|
| Pre-collection member | Weight per unit area (g/m$^2$) |  |  | 64.9 |  |
|  | Thickness (mm) |  |  | 0.56 |  |
|  | Collection efficiency (%) (Particle diameter 0.3 μm) |  |  | 68.5 |  |

TABLE 3-continued

|  | Contents | Comparative Example 1 | Comparative Example 2 | Comparative Example 3 | Comparative Example 4 (glass filter medium) |
|---|---|---|---|---|---|
|  | Collection efficiency per unit thickness (%/μm) |  |  | 0.206 |  |
|  | Pressure loss (Pa) |  |  | 31 |  |
| Upstream air permeable supporting material | Weight per unit area (g/m$^2$) | 40 | 40 | 40 |  |
|  | Thickness (mm) | 0.2 | 0.2 | 0.2 |  |
|  | Collection efficiency (%) (Particle diameter 0.3 μm) | 0 | 0 | 0 |  |
|  | Pressure loss (Pa) | <10 | <10 | <10 |  |
| First porous film | Component(s) | 3 components | 1 component | 1 component |  |
|  | Thickness (mm) | 0.05 | 0.009 | 0.009 |  |
|  | Pressure loss (Pa) | 60 | 118 | 118 |  |
|  | Collection efficiency (%) (Particle diameter 0.3 μm) | 99 | 99.998 | 99.998 |  |
|  | Dust holding capacity (PHC, 250 Pa) (g/m$^2$) | 26.5 | 4.5 | 4.5 |  |
| Middlestream air permeable supporting material | Weight per unit area (g/m$^2$) |  |  |  |  |
|  | Thickness (mm) |  |  |  |  |
|  | Collection efficiency (%) (Particle diameter 0.3 μm) |  |  |  |  |
|  | Pressure loss (Pa) |  |  |  |  |
| Second porous film | Component(s) | 3 components |  |  |  |
|  | Thickness (mm) | 0.05 |  |  |  |
|  | Pressure loss (Pa) | 70 |  |  |  |
|  | Collection efficiency (%) (Particle diameter 0.3 μm) | 99.7 |  |  |  |
|  | Dust holding capacity (PHC, 250 Pa) (g/m$^2$) | 22 |  |  |  |
| Downstream air permeable supporting material | Weight per unit area (g/m$^2$) | 40 | 40 | 40 |  |
|  | Thickness (mm) | 0.2 | 0.2 | 0.2 |  |
|  | Collection efficiency (%) (Particle diameter 0.3 μm) | 0 | 0 | 0 |  |
|  | Pressure loss (Pa) | <10 | <10 | <10 |  |
| Entire filter medium | Layer structure | 4 | 3 | 4 | 1 |
|  | Pressure loss (Pa) | 131 | 118 | 149 | 286 |
|  | Collection efficiency (%) (Particle diameter 0.3 μm) | 99.997 | 99.998 | 99.999 | 99.99 |
|  | Thickness (mm) | 0.49 | 0.36 | 0.69 | 0.4 |
|  | Dust holding capacity (PHC, 250 Pa) (g/m$^2$) | 25.0 | 4.5 | 31.0 | 18.5 |
|  | Dust holding capacity (DHC, 250 Pa) (g/m$^2$) | 2.6 | 2.5 | 9.3 | 2.8 |

TABLE 4

|  | Contents | Comparative Example 5 | Comparative Example 6 | Comparative Example 7 | Comparative Example 8 |
|---|---|---|---|---|---|
| Pre-collection member | Weight per unit area (g/m$^2$) |  | 65.4 | 71.8 | 48 |
|  | Thickness (mm) |  | 0.51 | 0.47 | 0.38 |
|  | Collection efficiency (%) (Particle diameter 0.3 μm) |  | 13.1 | 96.9 | 68.0 |
|  | Collection efficiency per unit thickness (%/μm) |  | 0.027 | 0.742 | 0.298 |
|  | Pressure loss (Pa) |  | 8 | 131 | 54 |
| Upstream air permeable supporting material | Weight per unit area (g/m$^2$) | 30 | 40 | 40 | 40 |
|  | Thickness (mm) | 0.16 | 0.2 | 0.2 | 0.2 |
|  | Collection efficiency (%) (Particle diameter 0.3 μm) | 0 | 0 | 0 | 0 |
|  | Pressure loss (Pa) | <10 | <10 | <10 | <10 |
| First porous film | Component(s) | 3 components | 3 components | 3 components | 3 components |
|  | Thickness (mm) | 0.05 | 0.05 | 0.05 | 0.05 |
|  | Pressure loss (Pa) | 70 | 60 | 60 | 60 |
|  | Collection efficiency (%) (Particle diameter 0.3 μm) | 99.7 | 99 | 99 | 99 |
|  | Dust holding capacity (PHC, 250 Pa) (g/m$^2$) | 22 | 26.5 | 26.5 | 26.5 |

TABLE 4-continued

|  | Contents | Comparative Example 5 | Comparative Example 6 | Comparative Example 7 | Comparative Example 8 |
|---|---|---|---|---|---|
| Middlestream air permeable supporting material | Weight per unit area (g/m$^2$) | 30 | | | |
| | Thickness (mm) | 0.16 | | | |
| | Collection efficiency (%) (Particle diameter 0.3 μm) | 0 | | | |
| | Pressure loss (Pa) | <10 | | | |
| Second porous film | Component(s) | 3 components | 3 components | 3 components | 3 components |
| | Thickness (mm) | 0.05 | 0.05 | 0.05 | 0.05 |
| | Pressure loss (Pa) | 70 | 70 | 70 | 70 |
| | Collection efficiency (%) (Particle diameter 0.3 μm) | 99.7 | 99.7 | 99.7 | 99.7 |
| | Dust holding capacity (PHC, 250 Pa) (g/m$^2$) | 22 | 22 | 22 | 22 |
| Downstream air permeable supporting material | Weight per unit area (g/m$^2$) | 30 | 40 | 40 | 40 |
| | Thickness (mm) | 0.16 | 0.2 | 0.2 | 0.2 |
| | Collection efficiency (%) (Particle diameter 0.3 μm) | 0 | 0 | 0 | 0 |
| | Pressure loss (Pa) | <10 | <10 | <10 | <10 |
| Entire filter medium | Layer structure | 5 | 5 | 5 | 5 |
| | Pressure loss (Pa) | 140 | 142 | 269 | 186 |
| | Collection efficiency (%) (Particle diameter 0.3 μm) | 99.997 | 99.994 | 99.9998 | 99.997 |
| | Thickness (mm) | 0.58 | 0.73 | 0.69 | 0.87 |
| | Dust holding capacity (PHC, 250 Pa) (g/m$^2$) | 20.0 | 48.7 | 34.6 | 49.0 |
| | Dust holding capacity (DHC, 250 Pa) (g/m$^2$) | 2.6 | 4.7 | 7.2 | 6.7 |

As it can be understood from Tables 1 to 4, in any of the examples, it is possible to have a dust holding capacity of the entire filter medium of 50 g/m$^2$ or more for polyalphaolefin particles, and to have a dust holding capacity of the entire filter medium of 5.0 g/m$^2$ or more for NaCl particles, even when the collection efficiency of the entire filter medium is maintained at 99.97% or more while keeping the pressure loss of the entire filter medium at 200 Pa or less, which means that an unprecedented dust holding capacity is achieved.

Here, for example, compared to Comparative Examples 1, 2 and 5 which are not equipped with a pre-collection member, it can be understood that, in any of the examples, the dust holding capacity for polyalphaolefin particles and that for NaCl particles are enhanced.

Note that, when Example 4 is compared to Comparative Example 3, and when Comparative Example 1 is compared to Comparative Example 2, it can be understood that the dust holding capacity for polyalphaolefin particles in particular and that for NaCl particles are enhanced when the second porous film is installed and the porous films are constituted by three components.

Moreover, the collection efficiency for NaCl particles having a particle diameter of 3 μm of the pre-collection member in Comparative Example 6 is too low, and the collection efficiency per unit of thickness for NaCl particles having a particle diameter of 3 μm is also too low, and therefore it can be understood that the dust holding capacity for polyalphaolefin particles and that for NaCl particles are insufficient. This is considered to be caused by the failure of the pre-collection member to collect collecting targets, and too much load is imposed on the first porous film and the second porous film arranged downstream of the pre-collection member: thus, clogging of the first porous film and/or the second porous film precedes clogging of the pre-collection member, and clogging of the filter media as a whole also develops prematurely.

Moreover, the collection efficiency for NaCl particles having a particle diameter of 3 μm of the pre-collection member of Comparative Example 7 is too high, and the collection efficiency per unit of thickness for NaCl particles having a particle diameter of 3 μm is also too high, and therefore it can be understood that the dust holding capacity for polyalphaolefin particles and that for NaCl particles are insufficient. This is considered to be caused by the pre-collection member collecting targets in excess, and before the first porous film and the seconf porous film arranged downstream of the pre-collection member begin to collect collecting targets, despite the capacity of the first porous film and the second porous film to further collect collecting targets, clogging of the pre-collection member develops, and clogging of the filter media as a whole also develops prematurely.

Further, since the thickness of the filter media of Comparative Example 8 is small, the dust holding capacity of the pre-collection member for polyalphaolefin particles is insufficient. This is considered to be caused by thickness of the pre-collection member being small so as to have a limited dust holding capacity for collecting targets, which leads to premature clogging of the pre-collection member.

Moreover, the collection efficiency of the pre-collection member of Example 4 is comparable to that of the pre-collection member of the above Comparative Example 8 (i.e., 68.5% in Example 4 and 68.0% in Comparative Example 8). As such, the pre-collection member of Example 4 and the pre-collection member of Comparative Example 8 have different thicknesses even though their collection efficiencies are comparable with each other, and the thickness of the pre-collection member of Example 4 of 0.56 mm is larger than that of the pre-collection member of Comparative Example 8 of 0.38 mm. As such, it can be understood that it is possible that the dust holding capacity for polyalphaolefin particles and that for NaCl particles in Example 4 are larger than those in Comparative Example 8 (Further, as compared to Example 4, the presence of an upstream airpermeable supporting material of Comparative Example 8 has no substantive effect on dust holding capacity).

Moreover, the same holds true for the relationship between the pre-collection member of Example 6 and that of Comparative Example 8. Namely, the collection efficiency of the pre-collection member of Example 6 is comparable to the collection efficiency of the pre-collection member of above Comparative Example 8 (i.e., 68.5% in Example 6 and 68.0% in Comparative Example 8). However, the pre-collection member of Example 6 and the pre-collection member of Comparative Example 8 have different thicknesses, and the thickness of the pre-collection member of Example 6 of 0.56 mm is larger than the thickness of the pre-collection member of Comparative Example 8 of 0.38 mm. Further, even though there is no difference between the pressure loss of the first porous film and that of the second porous film in Example 6, it can be understood that the dust holding capacity for polyalphaolefin particles and that for NaCl particles in Example 6 can be made higher than those in Comparative Example 8. Further, thickness of the pre-collection member of Example 8 is still larger than that of the pre-collection member of Example 6 which has a comparable collection efficiency of the pre-collection member as that of the pre-collection member of Example 8 (i.e., a collection efficiency of 68.5% and a thickness of 0.56 mm in Example 6, compared to a collection efficiency of 68.0% and a thickness of 0.92 mm in Example 8). Further, it can be understood that, in Example 8 where thickness of the pre-collection member is large, the dust holding capacity for polyalphaolefin particles can still be enhanced compared to that for polyalphaolefin particles in Example 6 where the collection efficiency of the pre-collection member is comparable to that of the pre-collection member in Example 8. Thereby, it can be understood that enlarging the thickness of the pre-collection member can contribute to enhancing the dust holding capacity for liquid particles of polyalphaolefin particles that can readily reach a porous film. Further, when the collection efficiencies of the pre-collection members are comparable to each other, enlarging the thickness of the pre-collection member can contribute to enhancing the dust holding capacity for liquid particles of polyalphaolefin particles. However, when the thickness of the pre-collection member exceeds 0.70 mm, it can be understood that the dust holding capacity for NaCl particles that are solid particles may be reduced.

Note that, among the examples, in Examples 4, 6 and 7 where the collection efficiency per unit of thickness (%/μm) of the pre-collection member for NaCl particles having a particle diameter of 0.3 μm is 0.19% or more and 0.25% or less when air containing the NaCl particles is passed through the pre-collection member at a flow rate of 5.3 cm/s, it is understood that both the dust holding capacity for polyalphaolefin particles and the dust holding capacity for NaCl particles are remarkably enhanced.

Accordingly, the filter medium for an air filter, the filter pack, the air filter unit, and the method for producing the filter medium for an air filter have been described in detail. However, the present invention is not limited to the embodiments mentioned above, and includes various revisions and modifications within the scope that does not depart from the spirit of the present invention.

REFERENCE SIGNS LIST

1 Filter medium for air filter
2 Filter medium for air filter
3 Filter medium for air filter
4 Filter medium for air filter
5 Filter medium for air filter
10 Pre-collection member
21 Upstream air permeable supporting material
22 Downstream air permeable supporting material
23 Midstream air permeable supporting material
31 First porous film
32 Second porous film
40 Filter pack
50 Frame
60 Air filter unit

CITATION LIST

Patent Literature

Patent Literature 1: Japanese Laid-open Patent Publication No. 2013-52320
Patent Literature 2: Japanese Laid-open Patent Publication No. 2013-63424

The invention claimed is:
1. A filter medium for an air filter to collect dust in an air current, the medium comprising:
   a first porous film primarily containing a fluororesin;
   a second porous film primarily containing a fluororesin and arranged on a side that is downstream of the air current of the first porous film; and
   a pre-collection member arranged on a side that is upstream of the air current of the first porous film and configured to collect a portion of the dust in the air current,
   the first porous film and the second porous film each having a pressure loss of 30 Pa or more and 90 Pa or less when air is passed through each porous film at a flow rate of 5.3 cm/s, and having a collection efficiency of 95% or more and 99.9% or less for NaCl particles having a particle diameter of 0.3 μm when air containing the NaCl particles is passed through each of the porous films at a flow rate of 5.3 cm/s, and
   the pre-collection member having a pressure loss of 5 Pa or more and less than 55 Pa when air is passed through the member at a flow rate of 5.3 cm/s, having a collection efficiency of 15% or more and less than 85% for NaCl particles having a diameter of 0.3 μm when air containing the particles is passed through the member at a flow rate of 5.3 cm/s, and having a thickness of more than 0.4 mm.

2. The filter medium for an air filter according to claim 1, wherein
   the pre-collection member is constituted by a glass fiber-filter medium.

3. The filter medium for an air filter according to claim 1, wherein
   the pre-collection member has a thickness of 0.8 mm or less.

4. The filter medium for an air filter according to claim 1, wherein
   the filter medium for an air filter has a dust holding capacity of 50 g/m² or more for polyalphaolefin particles having a count median particle diameter of 0.25 μm when air containing the polyalphaolefin particles is continuously passed through the filter medium at a flow rate of 5.3 cm/s and the pressure loss is increased by 250 Pa, and
   the filter medium for an air filter has a dust holding capacity of 5.0 g/m² or more for NaCl particles having a count median particle diameter of 0.1 μm when air containing the NaCl particles is continuously passed through the filter medium at a flow rate of 5.3 cm/s and the pressure loss is increased by 250 Pa.

5. The filter medium for an air filter according to claim 1, wherein
each of the first porous film and the second porous film has a dust holding capacity of 20 g/m$^2$ or more and 35 g/m$^2$ or less for polyalphaolefin particles having a count median particle diameter of 0.25 µm when air containing the polyalphaolefin particles is continuously passed through the filter medium at a flow rate of 5.3 cm/s and the pressure loss is increased by 250 Pa.

6. The filter medium for an air filter according to claim 1, further comprising:
an upstream air permeable supporting material arranged on the side that is upstream of the air current of the first porous film to support the first porous film.

7. The filter medium for an air filter according to claim 1, further comprising:
a downstream air permeable supporting material arranged on a side that is downstream of the air current of the second porous film to support the second porous film.

8. The filter medium for an air filter according to claim 1, wherein
the pressure loss of the first porous film is less than that of the second porous film when air is passed through each of the porous films at a flow rate of 5.3 cm/s, and
the collection efficiency of the second porous film is higher than that of the first porous film when air containing NaCl particles having a particle diameter of 0.3 µm is passed through each of the porous films at a flow rate of 5.3 cm/s.

9. The filter medium for an air filter according to claim 1, wherein
the first porous film and the second porous film primarily include fiberizable polytetrafluoroethylene, a non-fiberizable non-heat melt processable component, and a non-fiberizable heat melt processable component having a melting point less than 320° C.

10. The filter medium for an air filter according to claim 1, wherein
the pressure loss of the filter medium for an air filter is less than 200 Pa when air is passed through the filter medium at a flow rate of 5.3 cm/s, and
the collection efficiency of the filter medium for NaCl particles having a particle diameter of 0.3 µm is 99.97% or more when air containing the NaCl particles is passed through the filter medium at a flow rate of 5.3 cm/s.

11. A filter pack comprising:
the filter medium for an air filter according to claim 1.

12. An air filter unit comprising:
the filter pack according to claim 11, and
a frame to retain the filter pack.

13. A method for producing a filter medium for an air filter for collecting dust in air, the method comprising:
(a) a step of obtaining a first porous film and a second porous film, both of the films primarily containing a fluororesin;
(b) a step of arranging the first porous film on a side that is upstream of an air stream of the second porous film; and
(c) a step of arranging a pre-collection member on a side that is upstream of the air current of the first porous film so as to collect a portion of the dust in the air current,
the first porous film and the second porous film each having a pressure loss of 30 Pa or more and 90 Pa or less when air is passed through each porous film at a flow rate of 5.3 cm/s, and having a collection efficiency for NaCl particles having a particle diameter of 0.3 µm of 95% or more and 99.9% or less when air containing the NaCl particles is passed through each of the porous films at a flow rate of 5.3 cm/s,
the pre-collection member having the pressure loss of 5 Pa or more and less than 55 Pa when air is passed through the member at a flow rate of 5.3 cm/s, the collection efficiency of 15% or more and less than 85% for NaCl particles having a diameter of 0.3 µm when air containing the particles is passed through the member at a flow rate of 5.3 cm/s, and a thickness of more than 0.4 mm, and
the method further comprising a step of integrating the first porous film, the second porous film, and the pre-collection member by heat lamination.

14. The method for producing a filter medium for an air filter according to claim 13, further comprising:
a step of arranging an upstream air-permeable supporting material that supports the first porous film on the side that is upstream of the air current of the first porous film.

15. The method for producing a filter medium for an air filter according to claim 13, further comprising:
a step of arranging a downstream air-permeable supporting material that supports the second porous film on a side that is downstream of the air current of the second porous film.

16. The filter pack according to claim 11, wherein
the filter medium for an air filter is constituted by being processed into a zigzag configuration having mountain folds and valley folds repeated in alternating fashion.

17. The filter pack according to claim 12, wherein
the filter medium for an air filter is constituted by being processed into a zigzag configuration having mountain folds and valley folds repeated in alternating fashion.

* * * * *